(12) United States Patent
Lanman et al.

(10) Patent No.: US 10,740,876 B1
(45) Date of Patent: Aug. 11, 2020

(54) SYSTEMS AND METHODS FOR GENERATING DEFOCUS BLUR EFFECTS

(71) Applicant: Facebook Technologies, LLC, Menlo Park, CA (US)

(72) Inventors: Douglas Robert Lanman, Bellevue, WA (US); Matthew Steven Chapman, Redmond, WA (US); Alexander Jobe Fix, Seattle, WA (US); Anton S. Kaplanyan, Redmond, WA (US); Lei Xiao, Redmond, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 35 days.

(21) Appl. No.: 16/040,425

(22) Filed: Jul. 19, 2018

Related U.S. Application Data

(60) Provisional application No. 62/621,039, filed on Jan. 23, 2018.

(51) Int. Cl.
*G06T 5/00* (2006.01)
*G06N 3/08* (2006.01)
(Continued)

(52) U.S. Cl.
CPC .......... *G06T 5/002* (2013.01); *G02B 27/017* (2013.01); *G06N 3/04* (2013.01); *G06N 3/08* (2013.01); *G06T 2207/10028* (2013.01)

(58) Field of Classification Search
CPC .......... G02B 27/017; G02B 2027/0178; G02B 2027/014; G02B 2027/0118;
(Continued)

(56) References Cited

U.S. PATENT DOCUMENTS

| | | | |
|---|---|---|---|
| 2003/0067422 A1* | 4/2003 | Suyama | G02B 27/2278 345/6 |
| 2008/0187305 A1* | 8/2008 | Raskar | G02B 27/0075 396/268 |

(Continued)

OTHER PUBLICATIONS

Abadi, et al., TensorFlow: Large-Scale Machine Learning on Heterogeneous Systems, 2015, 19 pages. Available at https://wwwtensorflow.org/.

(Continued)

*Primary Examiner* — Nimesh Patel
(74) *Attorney, Agent, or Firm* — Baker Botts L.L.P.

(57) ABSTRACT

In one embodiment, a system may access a training sample from a training dataset, including a training image of a scene and a corresponding depth map. The system may access a circle-of-confusion map for the scene, which is generated based on the depth map and encodes a desired focal surface in the scene. The system may generate an output image by processing the training image, the corresponding depth map, and the corresponding circle-of-confusion map using a machine-learning model. The system may update the machine-learning model based on a comparison between the generated output image and a target image depicting the scene with a desired defocus-blur effect. The updated machine-learning model is configured to generate images with defocus-blur effect based on input images and corresponding depth maps.

20 Claims, 26 Drawing Sheets
(15 of 26 Drawing Sheet(s) Filed in Color)

(51) Int. Cl.
*G02B 27/01* (2006.01)
*G06N 3/04* (2006.01)

(58) Field of Classification Search
CPC ........ G02B 2027/0187; G02B 27/0172; G02B 5/30; G02B 2027/0138; G02B 2027/0147; G02B 2027/0112; G02B 2027/0127; G02B 2027/0132; G02B 5/18; G02B 2027/0123; G02B 2027/0134; G02B 27/0075; G02B 27/2278; G02B 27/2285; G02B 3/14; G02B 17/0896; G02B 27/2292; G06F 3/017; G06F 3/011; G06F 3/005; G06F 1/163; G06F 3/0488; G06F 3/03547; G06F 3/167; G06F 13/00; G06F 3/012; G06F 3/014; G06F 3/0346; G06F 3/04815; G06F 19/3481; G06F 2203/0331; G06F 2203/0338; G06F 2203/04803; G06F 3/04842; G06T 19/006; G06T 19/003; G06T 2210/41; G06T 15/10; G06T 2200/04; G06T 2207/10072; G06T 2207/20076; G06T 2207/20081; G06T 2207/20084; G06T 2207/30096; G06T 2207/30252; G06T 7/0002; G06T 7/0012; G06T 7/143; G06T 7/248; G09B 5/02; G09B 19/00; G09B 5/06; G09B 9/00; G09B 5/065; A61B 5/055; A61B 3/113; A61B 5/0004; A61B 5/0022; A61B 5/7267; A61B 5/7282; A61B 5/746; A61B 6/032; A61B 6/5217; A61B 8/085; A61B 8/481; A61B 8/5223; G16H 50/20; G16H 50/50; G16H 10/60; G16H 20/70; G16H 30/40; G16H 40/63
See application file for complete search history.

(56) References Cited

U.S. PATENT DOCUMENTS

| | | | | |
|---|---|---|---|---|
| 2010/0254596 | A1* | 10/2010 | Xiong | G06T 3/4053 382/159 |
| 2011/0080466 | A1* | 4/2011 | Kask | G06T 5/006 348/43 |
| 2016/0042501 | A1* | 2/2016 | Huang | G06T 5/003 345/428 |
| 2016/0163053 | A1* | 6/2016 | Tang | H04N 5/23222 348/135 |
| 2016/0270656 | A1* | 9/2016 | Samec | A61B 3/085 |
| 2017/0134717 | A1* | 5/2017 | Trail | H04N 13/344 |
| 2017/0255262 | A1* | 9/2017 | Liu | G06F 3/015 |
| 2017/0262054 | A1* | 9/2017 | Lanman | G06F 3/013 |
| 2019/0156793 | A1* | 5/2019 | Sun | H04N 13/383 |

OTHER PUBLICATIONS

Akeley, et al., A Stereo Display Prototype with Multiple Focal Distances, ACM Trans. Graph. 2004, 23(3):804-813.
Altgit, et al., Neareye Varifocal Augmented Reality Display Using See-through Screens, ACM Trans. Graph. (2017), 189:1-189:13.
Bako, et al., Kernel-Predicting Convolutional Networks for Denoising Monte Carlo Renderings, ACM Trans. Graph. 2017, 36(4):97.1-14.
Barsky, et al., Algorithms for Rendering Depth of Field Effects, WSEAS International Conference on Computers in Computer Graph. (ICCOMP), 2008, 999-1010.
Burge, et al., Optimal defocus estimation in individual natural images, PNAS, Oct. 4, 2011, 108(40):16849-16854.
Chaitanya, et al., Interactive Reconstruction of Monte Carlo Image Sequences Using a Recurrent Denoising Autoencoder, ACM Trans. Graph. 36, 4 (2017), 98:1-98:12.
Chen, et al., Fast image processing with fully-convolutional networks, IEEE International Conference on Computer Vision, 2017, 2497-2506.
Cholewiak, et al., ChromaBlur: Rendering chromatic eye aberration improves accommodation and realism, ACM Trans. Graph. (2017), 36(6):210.1-12.
Clevert, et al., Fast and accurate deep network learning by exponential linear units (elus), arXiv preprint arXiv:1511.0 7289v1, Nov. 23, 2015, p. 1-14.
Cook, et al., Distributed Ray Tracing, SIGGRAPH Comput. Graph, 1984, 18(3): 137-145.
Demers, Depth of Field: A Survey of Techniques. In GPU Gems, Randima Fernando (Ed.). Addison-Wesley, 2004, 11 pages.
Didyk, et al., Joint View Expansion and Filtering for Automultiscopic 3D Displays, ACM Transactions on Graphics, 2013, 1-9.
Dunn, et al., Wide Field of View Varifocal Near-Eye Display Using See-Through Deformable Membrane Mirrors, IEEE Transactions on Visualization and Computer Graphics, 2017, 23(4):1275-1284.
Flynn, et al., DeepStereo: Learning to Predict New Views From the World's Imagery, CVPR 2016, 5515-5524.
Gatys, et al., Texture Synthesis Using Convolutional Neural Networks, In Proc. Neural Information Processing Systems (NIPS), 2015, 9 pages.
Gharbi, et al., Deep bilateral learning for real-time image enhancement, ACM Trans. Graph. (2017), 36(4):118.1-12.
Gharbi, et al., Deep Joint Demosaicking and Denoising, ACM Trans, (2016), 1-12.
Glorot, et al., Understanding the difficulty of networks, Proc. Artificial Intelligence and Statistics, training deep feedforward neural networks, Proc. Artificial Intelligence and Statistics, 2010, 249-256.
Haeberli, et al., The Accumulation Buffer: Hardware Support for High-quality Rendering, SGGRPH 1990, 24(4):309-318.
He, et al., Deep residual learning for image recognition, Proc. CVPR, 2016, 770-778.
Held, et al., Blur and Disparity Are Complementary Cues to Depth, Current Biology 22, 2012, 426-431.
Held, et al., Using Blur to Affect Perceived Distance and Size, ACM Trans Graph. (2010), 29(2):19.1-17.
Hoffman, et al., Vergence-accommodation conflicts hinder visual performance and cause visual fatigue. Journal of Vision 8, 3 (2008), 33, 1-30.
Hu, et al., High-resolution optical see-through multi-focal-plane head-mounted display using freeform optics, Optics Express (2014), 22(11):1-8.
Hua, et al., A 3D integral imaging optical see-through headmounted display, Optics Express (2014), 22(11):1-8.
Huang, et al., The Light Field Stereoscope: Immersive Computer Graphics via Factored Near-eye Light Field Displays with Focus Cues, ACM Trans Graph, Article 60, 34(4):1-12. (2015).
Ioffe, et al., Batch normalization: Accelerating deep network training by reducing internal covariate shift, International Conference on Machine Learning, 2015, 1-9.
Johnson, et al., Perceptual losses for real-time style transfer and super-resolution, European Conference Computer Vision, 2016, 694-711.
Kalantari, et al., Learning- Based View Synthesis for Light Field Cameras. ACM Trans Graph, 2016, 1-10.
Kellnhofer, et al., 3DTV at Home: Eulerian-Lagrangian Stereo-to-Multiview Conversion, ACM Trans. Graph. 2017, 36(4):146.1-13.
Kfivanek, et al., Fast Depth of Field Rendering with Surface Splatting, In Proceedings of Computer Graphics International, 2003, 1-6.
Kingma, et al., Adam: A method for stochastic optimization, arXiv preprint arXir1412.6980V1 (2014), 1-9.
Konrad, et al., Accommodation-invariant Computational Near-eye Displays, ACM Trans. Graph, 2017, 36(4):88.1-12.
Konrad, et al., Novel Optical Configurations for Virtual Reality: Evaluating User Preference and Performance with Focus-tunable and Monovision Near-eye Displays, ACM Conference on Human Factors in Computing Systems (CHI), (2016), 10 pages.
Koulieris, et al., Accommodation and comfort in head-mounted displays, ACM Trans. Graph, (2017), Article 87, 36(4):1-12.

(56) References Cited

OTHER PUBLICATIONS

Kramida, Resolving the Vergence-Accommodation Conflict in Head-Mounted Displays, IEEE TVCG (2016), 22(7):1912-1931.
Kraus, et al., Depth-of-Field Rendering by Pyramidal Image Processing, Computer Graphics Forum, 2007, 26(3):1-10.
Kruger, et al., Stimuli for accommodation, Blur, chromatic aberration and size, Vision Research, 1986, 26(6):957-971.
Lanman, et al., Near-Eye Light Field Displays, ACM Trans. Graph, Article 220 (2013), 32(6):1-10.
Lecun, et al., Backpropagation applied to handwritten zip code recognition, Neural computation (1989), 1:541-551.
Liao, et al., Visual Attribute Transfer Through Deep Image Analogy, ACM Trans. Graph. (2017), 36(4):120:1-15.
Liu, et al., A systematic method for designing depth-fused multifocal plane three-dimensional displays, Optics express (2010), 18(11):11562-11573.
Long, et al., Fully convolutional networks for semantic segmentation, In Proa CVPR, 2015, 3431-3440.
Love, et al., High-speed switchable lens enables the development of a volumetric stereoscopic display, Optics Express (2009), 17(18):1-10.
Mantiuk, et al., HDR-VDP-2: a calibrated visual metric for visibility and quality predictions in all luminance conditions, ACM Trans. Graph., 2011, ACM, 30(40):40.1-13.
Masia, et al., A survey on computational displays: Pushing the boundaries of optics, computation, and perception, Computers & Graphics 37, 8 (2013), 1012-1038.
Mauderer, et al. Depth Perception with Gaze-contingent Depth of Field, Proc SACHI, 2014, 217-226.
Mercier, et al., Fast Gaze-Contingent Optimal De-compositions for Multifocal Displays, 2017, 36(6):237.1-15.
Nalbach, et al., Deep Shading. Convolutional Neural Networks for Screen Space Shading, Comput. Graph. Forum, 2017, 1-14.
Narain, et al., Optimal Presentation of Imagery with Focus Cues on Multi-plane Displays, ACM Trans. Graph, 2015, 34(4):59.1-13.
Neil, et al., Spatial-light-modulator-based three-dimensional multiplanar display, SPIE 3012 (1997), 337-341.
Padmanaban, et al., Optimizing virtual reality for all users through gaze-contingent and adaptive focus displays, National Academy of Sciences, 2017, 114(9):2183-2188.
Potmesi, et al., A Lens and Aperture Camera Model for Synthetic Image Generation, Computer Graph, 1981, 15(3):297-305.
Rolland, et al., Multifocal Planes Head-Mounted Displays, Applied Optics, 2000, 39(19):3209-3215.
Ronneberger, et al., U-net: Convolutional networks for biomedical image segmentation. In International Conference on Medical Image Computing and Computer-Assisted Intervention, 2015, Springer, 1-8.
Shibata, et al., The zone of comfort: Predicting visual discomfort with stereo displays, Journal of Vision, (2011), 8(11):1-29. arXiv:/data/Journals/JOV/932800/joy-11-8-11.pdf.
Shinya, Post-filtering for Depth of Field Simulation with Ray Distribution Buffer, Graphics Interface, 1994, 59-66.
Shiwa, et al., Proposal for a 3-D display with accommodative compensation: 3DDAC, J. Soc. Information Display, 1996, 4(4):255-261 Available at http://www.sidefx.com/. 1996-2018.
Shrivastava, et al., Learning from Simulated and Unsupervised Images through Adversarial Training, 2017, Proc. CVPR, 2107-2116.
Smithline, et al., Accommodative response to blur, 30SA, 1974, 64(11):1512-1516.
Soler, et al., Fourier Depth of Field, ACM Transactions on Graphics 28, Apr. 1, 2009, 2:1-18.
Srinivasan, et al., Learning to Synthesize a 4D RGBD Light Field from a Single Image, IEEE International Conference on Computer Vision, 2017, 2243-2251.
Sun, et al., Perceptually-guided Foveation for Light Field Displays, ACM Trans. Graph, 2017, 36(6):192:1-192:13. Unity Technologies. 2005-2018.
Ulyanov, et al., Texture Networks: Feed-forward Synthesis of Textures and Stylized Images, In Proa ICML, 2016, 1-9.
Wang, et al., Image quality assessment: from error visibility to structural similarity, JEFF transactions on image processing, 2004, 13(4):1-14.
Watt, et al., Real-world stereoscopic performance in multiple-focal-plane displays: How far apart should the image planes be? SPIE Stereoscopic Displays and Applications, 2012, 12 pages.
Widmer, et al., An Adaptive Acceleration Structure for Screen-space Ray Tracing, High-Performance Graphics, 2015, 10 pages.
Wu, et al., Content-adaptive focus configuration for near-eye multifocal displays, IEEE Multimedia and Expo, 2016, 6 pages.
Yan, et al., Automatic photo adjustment using deep neural networks, ACM Trans. Graph. (2016), 15 pages.
Yu, et al., Multi-Scale Context Aggregation by Dilated Convolutions, In Proc ICLR, 2016, 1-13.
Zannoli, et al., Blur and the perception of depth at occlusions, Journal of vision, 2016, 16(6):17.1-25.
Zhang, et al., Real-Time User-Guided Image Colorization with Learned Deep Priors, ACM Trans. Graph, 2017, 11 pages.

* cited by examiner

SYSTEMS AND METHODS FOR GENERATING DEFOCUS BLUR EFFECTS

PRIORITY

This application claims the benefit, under 35 U.S.C. § 119(e), of U.S. Provisional Patent Application No. 62/621,039, filed 23 Jan. 2018, which is incorporated herein by reference.

TECHNICAL FIELD

This disclosure generally relates to machine-learning and computer graphics.

BACKGROUND

Computational displays are aimed at bridging the gap between synthesized images and physical reality through the joint design of optics and rendering algorithms, as informed by our ever-expanding knowledge of the human visual system. Today's positionally tracked head-mounted displays (HMDs), which is a type of near-eye displays, present a means to more closely approach this goal than prior direct-view displays (e.g., computer monitors, smartphone screens, television displays, etc.), depicting accurate perspective, shading, binocular, and motion parallax depth cues. However, existing HMDs or near-eye displays rely on a fixed optical focus that does not accurately reproduce retinal blur throughout an extended scene, resulting in vergence-accommodation conflict (VAC). Sustained VAC has been associated with biased depth perception and visual fatigue.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

SUMMARY OF PARTICULAR EMBODIMENTS

Figure 1:
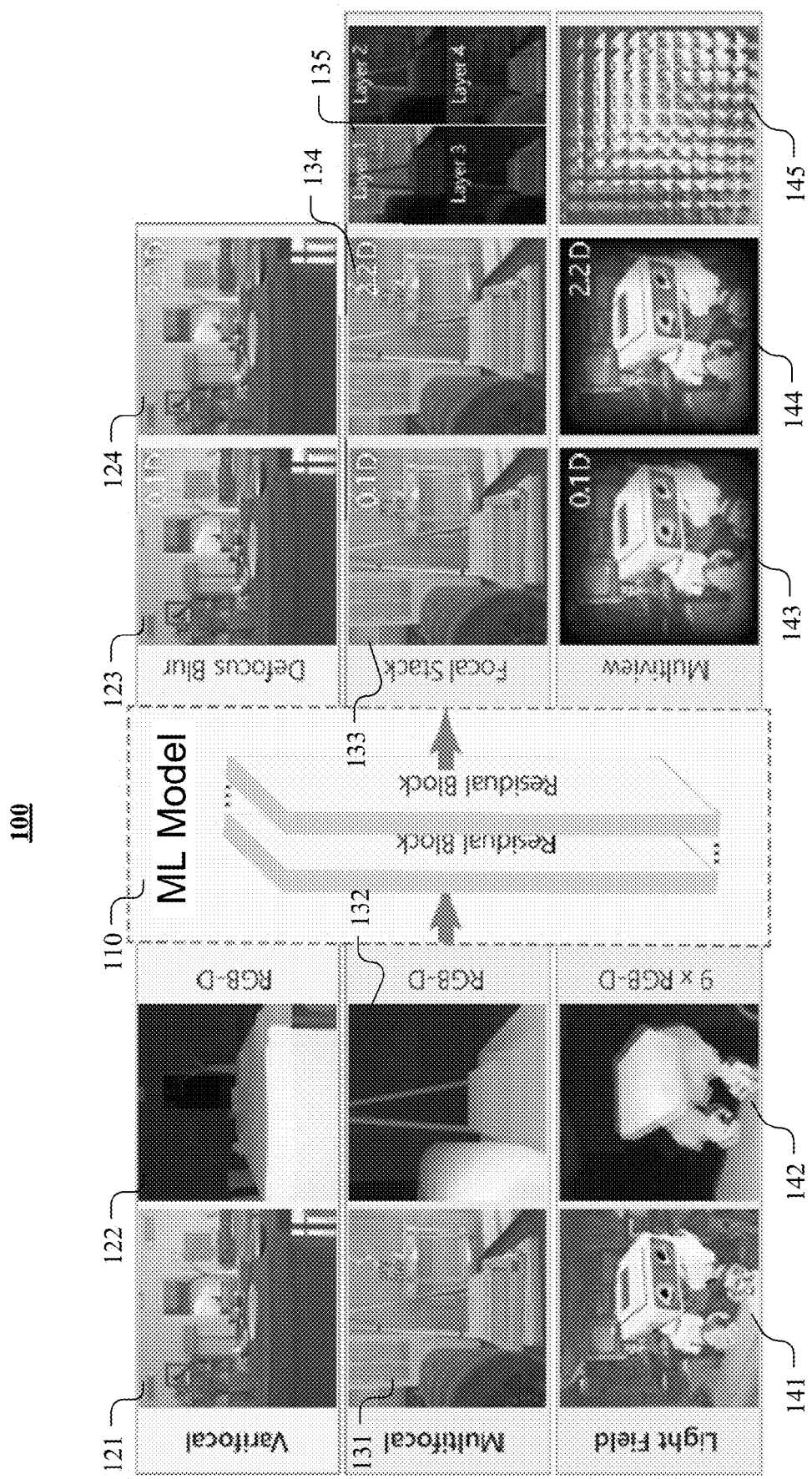
FIG. 1. illustrates an embodiment of a unified rendering and optimization framework that enables real-time operation of accommodation-supporting head-mounted displays.

Addressing vergence-accommodation conflict in head-mounted displays (HMDs) (or other types of near-eye displays) involves resolving two interrelated problems. First, the hardware may need to support viewing sharp imagery over the full accommodation (the focusing mechanism of the eyes) range of the user. Second, HMDs may need to accurately reproduce retinal defocus blur to correctly drive accommodation. A multitude of accommodation-supporting HMDs have been proposed, such as varifocal, multifocal, and light field displays. These designs extend depth of focus but rely on computationally-expensive rendering and optimization algorithms to reproduce accurate retinal blur (often limiting content complexity and interactive applications). No unified computational framework has been proposed to support driving these emerging HMDs using commodity content. Embodiments described herein introduce a generic, end-to-end trainable convolutional neural network designed to efficiently solve the full range of computational tasks for accommodation-supporting HMDs. This network is demonstrated to accurately synthesize defocus blur, focal stacks, multilayer decompositions, and multiview imagery using only a few frames of commonly available RGB-D (i.e., multi-color channels, such as red, green, and blue, and depth information) images. Leveraging recent advances in GPU hardware and best practices for image synthesis networks, the embodiments described herein enable real-time, near-correct depictions of retinal blur with a broad set of accommodation-supporting HMDs.

Particular embodiments described herein synthesize physically accurate defocus blur in real-time from a single RGB-D image. The generated images (e.g., including video frames) with the desired blurring effects may be consumed by any downstream application (e.g., additional post-processing algorithms or machine-learning models) and/or displayed by any suitable display device. For example, images with synthesizing defocus blur may be displayed on near-eye displays (e.g., varifocal displays or other types of artificial reality HMDs) as well as traditional two-dimensional flat-screen displays, such as television or computer monitors, cinema screens, mobile phones, tablets, signage displays, etc. For near-eye displays, the desired defocus-blurring effect may be attributed to the lensing parameters of the human eye (e.g., pupil size). For conventional displays, the desired defocus-blurring effect may be attributed to the lensing parameters of a camera. Embodiments described herein has the flexibility to accommodate changes in such lensing parameters to generate the desired blurring effect for any type of display or application. As such, the embodiments described herein for generating defocus blur may be used to replace or supplement the defocus rendering functions in graphics rendering systems.

In addition to synthesizing defocus blur, particular embodiments generalize the aforementioned unified computational framework to output a focal stack, with defocus blur inferred for a discrete set of focal distances, thereby supporting optimal rendering for multifocal displays. Real-time multilayer decompositions have been demonstrated for multifocal displays, taking either complete focal stacks or a single RGB-D image as input to directly solve this computationally expensive inverse optimization problem. By accepting direct RGB-D inputs, computational overhead introduced by focal stack generation may be avoided. Further, particular embodiments of the unified computational framework may be extended to handle the task of generating a dense light field from a sparse set of RGB-D images, supporting near-eye light field displays. It has been demonstrated that for all of these rendering problems, high accuracy may be achieved while using a particular embodiment of a single network architecture (differing only in the number of layers and number of features per layer), suggesting that these results generalize across applications.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Embodiments described herein are inspired by increasing evidence of the critical role retinal defocus blur plays in driving natural accommodative responses, as well as the perception of depth and physical realism. For example, it has been identified that retinal defocus blur, along with chromatic aberration and looming (i.e., changes in retinal image size), as potentially involved in accommodative control. It has also been reported that reliable depth may be estimated solely from defocus blur. Synthesizing accurate defocus blur has also been shown to result in the correct perception of depth and scale. It has also been shown that using a multifocal display, retinal defocus blur is sufficient to recover depth ordering. Moreover, it has been demonstrated that depicting accurate retinal defocus blur increases perceived realism.

Synthetically generated defocus blur, also referred to as the "depth of field" effect, may be produced by simulating a virtual camera with finite aperture. Conventionally, the aperture is sampled via stochastic ray tracing. The accumulation buffer is a well-known variant of this approach, wherein multiple views are rasterized from different points on the aperture and averaged to form a single image. While these methods can produce physically accurate defocus blur, they require many samples for out-of-focus pixels and, thus, are not suitable for real-time applications.

Two classes of approximated defocus blur have emerged for interactive and real-time applications, often aiming for aesthetic suitability rather than physical accuracy. The first class comprises methods that apply defocus effects before compositing the final image. For example, scatter methods involve splatting sprites, from far to near distances, which are scaled by the defocus magnitude. Such methods achieve high visual quality but come at the cost of resolving the visibility. The second class comprises methods that filter in image space. Such post-processing for approximating defocus blur from a single image with color and depth (RGB-D). Although such post-processing is commonly used in real-time applications, current approaches have a central limitation: information is missing for occluded surfaces, which become visible from the periphery of the camera aperture and, as a result, contribute to defocus blur. Particular embodiments described herein effectively applying post-processing, accounting for and predicting the conventionally missing information, so that existing rendering engines can be upgraded, with minimal effort, to create physically accurate blur for HMDs.

Accommodation-supporting HMDs have been proposed to mitigate VAC, not only with novel optical elements, but also with the joint design of rendering and optimization algorithms. These displays need to solve two interrelated problems. First, they need to create an extended depth of focus (EDoF) such that the viewer can sharply perceive virtual objects from within arm's reach out to the horizon. Second, they need to depict perceptually accurate retinal defocus blur. The varifocal and multifocal displays are two examples of such EDoF HMDs. Varifocal HMDs continuously adjust the virtual image distance, whereas multifocal HMDs create a volumetric depiction using multiple focal surfaces, further requiring a decomposition algorithm to partition the image across these layers. While differing in construction, both designs utilize synthetically rendered blur, rather than that created optically due to the natural accommodative response of the viewer. Without rendered blur, these displays create incorrect cues, which have been linked to diminished depth perception. Moreover, rendered blur may more effectively drive accommodation. Existing methods for synthesizing perceptually accurate retinal defocus blur is computationally taxing and requires modifications to existing rendering engines.

Near-eye light field displays, unlike other HMDs that rely on rendered blur, circumvent the need for accurate eye tracking. Near-eye light field displays approximate retinal blur by, for example, presenting the optical superposition of many viewpoints. However, these displays introduce another computational challenge: requiring the scene to be rendered from hundreds (or even thousands) of viewpoints. The computational challenge is even more acute for real-time applications, such as virtual reality and interactive games.

Particular embodiments described herein present a unified computational framework for efficient rendering into these accommodation-supporting HMDs or near-eye displays using machine learning. Specifically, particular embodiments utilize a trainable convolutional neural network (CNN) designed to efficiently solve the full range of computational tasks for emerging near-eye displays. The network synthesizes defocus blur, focal stacks, multilayer decompositions, and multiview imagery—the inputs required for all major variants of varifocal, multifocal, and light field displays. Moreover, embodiments use a modest input that can realistically be expected from conventional real-time rendering and photography systems: a color image and a depth map (i.e., an RGB-D input). Real-time performance has been demonstrated for these emerging computational displays, leveraging recent advances in GPU hardware and best practices for image synthesis networks. The architecture according to particular embodiments aims to introduce a practical, real-time computational framework to drive a broad class of accommodation supporting HMDs using commodity content. The embodiments described herein are designed to be a generalizable: as our understanding of the necessary qualities of retinal blur advances, so can the depictions learned to be synthesized by the network.

FIG. 1. illustrates an embodiment of a unified rendering and optimization framework 100, based on machine-learning models 110 (e.g., convolutional neural networks and other suitable network architecture), that enables real-time operation of accommodation-supporting head-mounted displays. In general, embodiments of the machine-learning network 110 are designed to generate images that retain the semantic and structural content of the input image, but with certain details changed (e.g., blurring). Referring to the top row in FIG. 1, for varifocal displays, particular embodiments train a machine-learning model 110 to take a single RGB-D input (e.g., color image 121 and corresponding depth map 122) and synthesize physically-accurate defocus blur. The output of such machine-learning model 110 may be simulated retinal images with defocus blur that is expected at particular focal distances, such as 0.1 D (e.g., output image 123) and 2.2 D (e.g., output image 124). Referring to the middle row in FIG. 1, for multifocal displays, the network in particular embodiments solves the inverse problem to output a multilayer decomposition. For example, the machine-learning model 110 may be trained to take a single RGB-D input (e.g., color image 131 and corresponding depth map 132) and output a predetermined number of image layers 135 (four layers are shown in FIG. 1). When a user views the layers 135 through a multifocal display, the user would see the blurred image 133 when focusing at 0.1 D and the blurred image 134 when focusing at 2.2 D. Referring to the bottom row in FIG. 1, for light field displays, particular embodiments generate dense multiview imagery from a sparse set of RGB-D images. In particular embodiments, the machine-learning model 110 may be trained to take as input nine (or any other suitable number of image samples) RGB-D images of a scene from various viewpoints (e.g., color image 141 and corresponding depth map 142 being one RGB-D example) and output a set of elemental images 145 of the scene from many more viewpoints. When a user views the set of images 145 through a light field display, the user would see the blurred image 143 when focusing at 0.1 D and the blurred image 144 when focusing at 2.2 D.

As discussed, particular embodiments may use machine learning to generate the desired outputs. Provided below is an overview of particular embodiments of a machine-learning architecture and its inputs and training procedures to support rendering for defocus blur, multifocal, and light field displays. The framework provides a unified design to efficiently solve these problems with high quality and real-time performance.

Particular embodiments of the machine-learning architecture may be based on a fully convolutional network (FCN). The FCN may have convolutions at every layer of the network, omitting the final fully-connected layer that some networks use for classification. FCNs are purely feed-forward networks, so evaluation can be highly efficient, although this depends on the number of layers and the size of convolution kernels. Various variants of the FCN may be used for image synthesis. For example, particular embodiments may use encoder-decoder networks having a "U-Net" shape, with successive down-sampling followed by up-sampling to produce the final image. The encoder-decoder architecture gives the output neurons a large receptive field, although to preserve detail in the final output, skip connections from the encoder layers to corresponding decoder layers may be used. Alternatively, the network can maintain full resolution at all layers, without any pooling. The receptive field of the output neurons can be increased with context aggregation networks, which use dilated convolutions instead of pooling.

For embodiments that are designed for near-eye display applications, certain optimizations in network architecture may be made to improve performance. For example, in non-near-eye applications, a pipelined, two-network architecture may be employed. The first network predicts disparity per-pixel and the second network predicts color images from this disparity and pre-warped versions of the input images. This two-network architecture, however, takes seconds to generate outputs for each frame, which is too slow for real-time applications. Since particular embodiments described herein are designed for near-eye display applications, certain complexities of the two-network architecture may be avoided. For example, there is no need to have a separate network to predict disparity, as it is provided as part of the RGB-D input. The optimized network architectures of the embodiments herein allow for much improved runtimes sufficient for real-time applications.

Figure 2A:
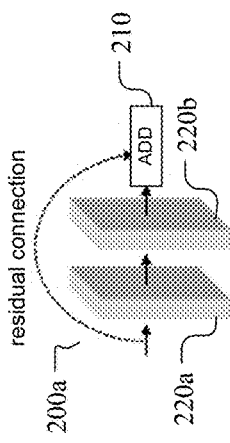
FIGS. 2A-C illustrate embodiments of the network architecture.
Figure 2B:
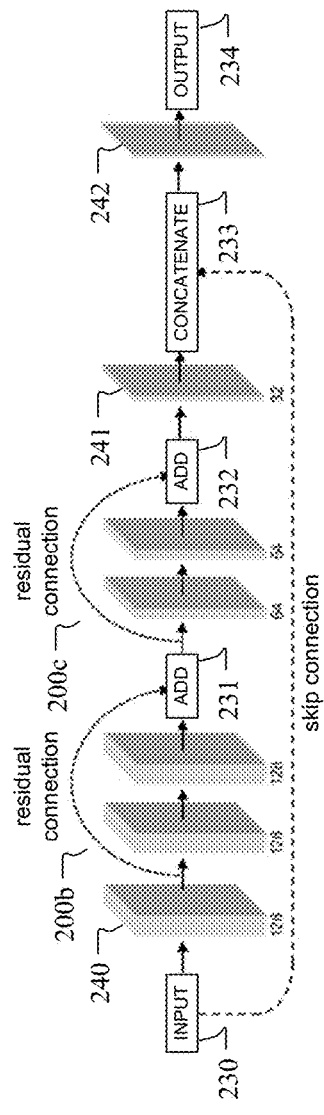
Figure 2C:
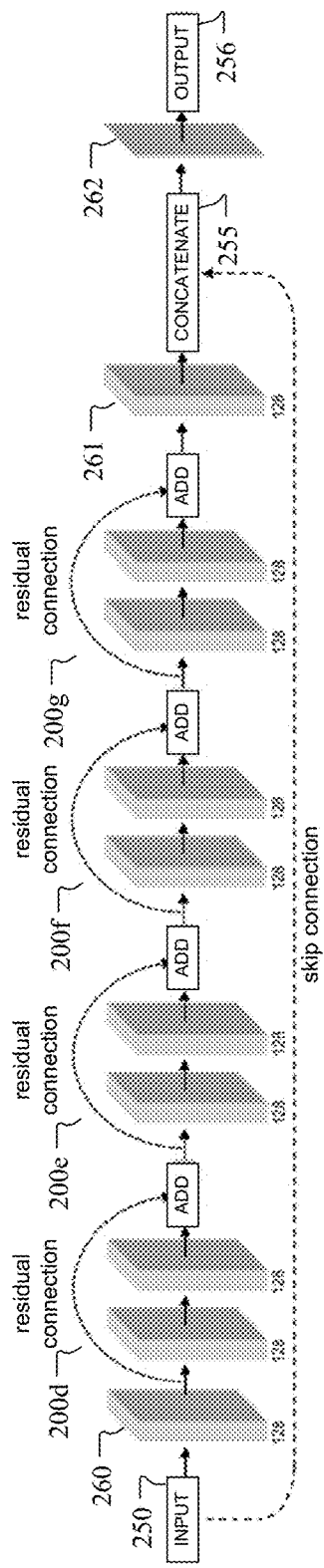

FIGS. 2A-C illustrate embodiments of the network architecture. At a high level, the network may be a fully convolutional network (FCN) with residual net blocks at each layer. In particular embodiments, the network may have full resolution at each layer, without pooling, with an added long-distance skip connection from the input to the final layer. In general, FIG. 2A shows an embodiment a residual block, which is used as the basic building block of the network;

FIG. 2B shows a fast network embodiment that has 7 layers and a varying number of filters at each layer (e.g., 128, 64, 32); and FIG. 2C shows a full network embodiment that has 11 layers with a constant number of filters (e.g., 128) at each layer. While a particular number of filters are depicted, the current disclosure contemplates other filter combinations as well. For example, particular embodiments of the 7-layer network may have a constant number of filters (e.g., 64, 128, or 256, etc.), and particular embodiments of the 11-layer network may have varying filters (e.g., 256, 128, 64, etc.).

More specifically, FIG. 2A depicts a single residual block 200a, the basic element of the network in particular embodiments. The residual block 200a shown has two layers, a first layer 220a and a second layer (or last layer) 220b. In other embodiments, the residual block 200a may have additional sequentially connected layers (e.g., instead of two layers as shown, it may have three, four, or any number of layers). Each residual block 200a may add 210 an input of its first layer 220a to the output of its last layer 220b through a "residual connection" before passing the added output to the next block (not shown in FIG. 2A). In particular embodiments, all weights may be set to zero, thus making the residual block 200a an identity function—small variations near zero allow the residual block 200a to learn to refine its input. This is particularly relevant for the image synthesis tasks, where the desired output is close to the original input but with added blur or slightly shifted viewpoint. The number of residual blocks and the number of filters in each layer are selected to balance the quality and the inference time for the applications. For example, FIG. 2B shows a seven-layered network with two residual blocks 200b-c that sacrifices some quality for inference speed, and FIG. 2C shows a larger eleven-layered network with four residual blocks 200d-g that sacrifices inference speed for quality. In particular embodiments, the seven-layer network shown in FIG. 2B, which is more tailored for speed, may take all channels as input and output color image results in a single pass of network evaluation.

The network architecture shown in FIG. 2B includes seven layers with two residual blocks 200b-c. Specifically, FIG. 2B shows an input 230 (e.g., RGB-D) being provided to a first layer 240. The output of the first layer 240 is passed to a first residual block 200b (with two layers), which is configured to add 231 the input of the block 200b to the output of the last layer in the block 200b. The result is then passed to a second residual block 200c, where a similar operation is performed. In particular embodiments, the second residual block 200c may be configured to reduce the size of the feature maps to further speed up operations (e.g., the first residual block 200b operates on 128 feature maps, whereas the second residual block 200c operates on 64 feature maps). The output of the second residual block 200c (i.e., the output of the add operation 232) is then passed to a next-to-last layer 241, which in particular embodiments may further reduce the size of the feature map (e.g., to 32). The network may be configured to concatenate 233 its next-to-last layer 241 with the input layer 230 (or a transformation thereof in particular embodiments) through a "skip connection" immediately before the last layer 242. This long-distance skip connection allows preserving high-frequency details in the imagery by letting the original image directly feed into the output layer.

FIG. 2C shows an embodiments of a more complex network architecture that is similar to FIG. 2B but with more layers (eleven). The network shown in FIG. 2C uses four sequentially connected residual blocks 200d, 200e, 200f, 200g. The input 250 is provided to a first layer 260, and the output of which is provided to the sequent of residual blocks 200d-g. In particular embodiments, the layers within the residual blocks 200d-g do not reduce the size of the feature maps, as was done in the embodiment shown in FIG. 2B. Reducing the feature-map size may improve inference speed but at the cost of quality. Thus, in an embodiment such as the one shown in FIG. 2C where quality is more important, the feature-map size may remain the same without reduction. The output of the last residual block 200g is then passed to a next-to-last layer 261. The network may be configured to concatenate 255 its next-to-last layer 261 with the input layer 250 through a "skip connection" immediately before the last layer 262. Again, this long-distance skip connection allows preserving high-frequency details in the imagery by letting the original image directly feed into the output layer. In particular embodiments, the eleven-layer network shown in FIG. 2C, which is more tailored for quality than speed, may process each color channel in a separate pass, therefore three channels of input RGB images are either processed sequentially or put together in a batch for network evaluation.

In particular embodiments, each layer of the network (e.g., the ones shown in FIGS. 2B and 2C) may sequentially perform 2 D convolutions with 3×3 filters (or filters of any other suitable size, such as 5×5), does batch normalization, and then applies the exponential linear unit (ELU) activation function, with the exception of the last layer (e.g., 242 and 262). The last layer uses the hyperbolic tangent (Tan H) activation function scaled by $f(x)=(x+1)/2$ to bring the output (e.g., 234 and 256) within the range [0, 1]. Since the network is fully convolutional, it can be evaluated efficiently on GPU devices and scales to different image resolutions without retraining.

In particular embodiments, the loss function for all applications includes a pixel-wise cost on PSNR of the result. A cost on differences may be included in the gradient image $\nabla y$, which further penalizes differences in fine details like edges. Detailed embodiments of the loss function are described in further detail below.

Embodiments of the machine-learning model can be trained and applied to various imagery tasks for computational displays by changing the input and output of the network. In particular embodiments, the machine-learning model may be based on a convolutional neural network, such as the ones shown in FIGS. 2A-C. In other embodiments, the machine-learning model may be an autoencoder, a generative adversarial network, or any other suitable machine-learning architecture. Embodiments of the model may be configured to generate images for varifocal displays, multifocal displays, and light field displays, as described in further detail below.

Rendering Defocus Blur for Varifocal and EDoF Displays

Figure 3A:
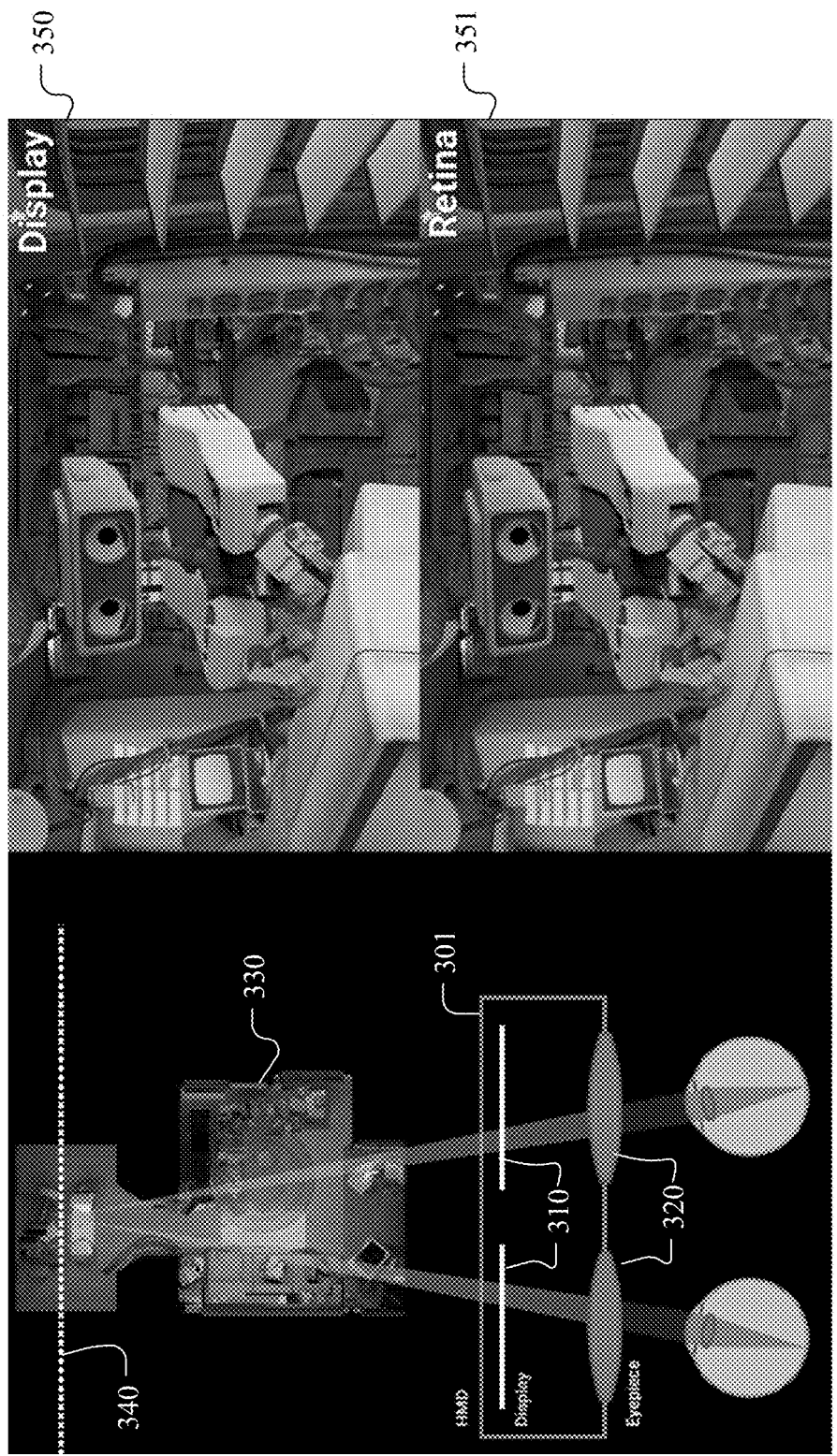
FIGS. 3A-B illustrate an example of a head-mounted display (HMD), an image displayed thereon, and the image as seen by a user based on his/her focus.
Figure 3B:
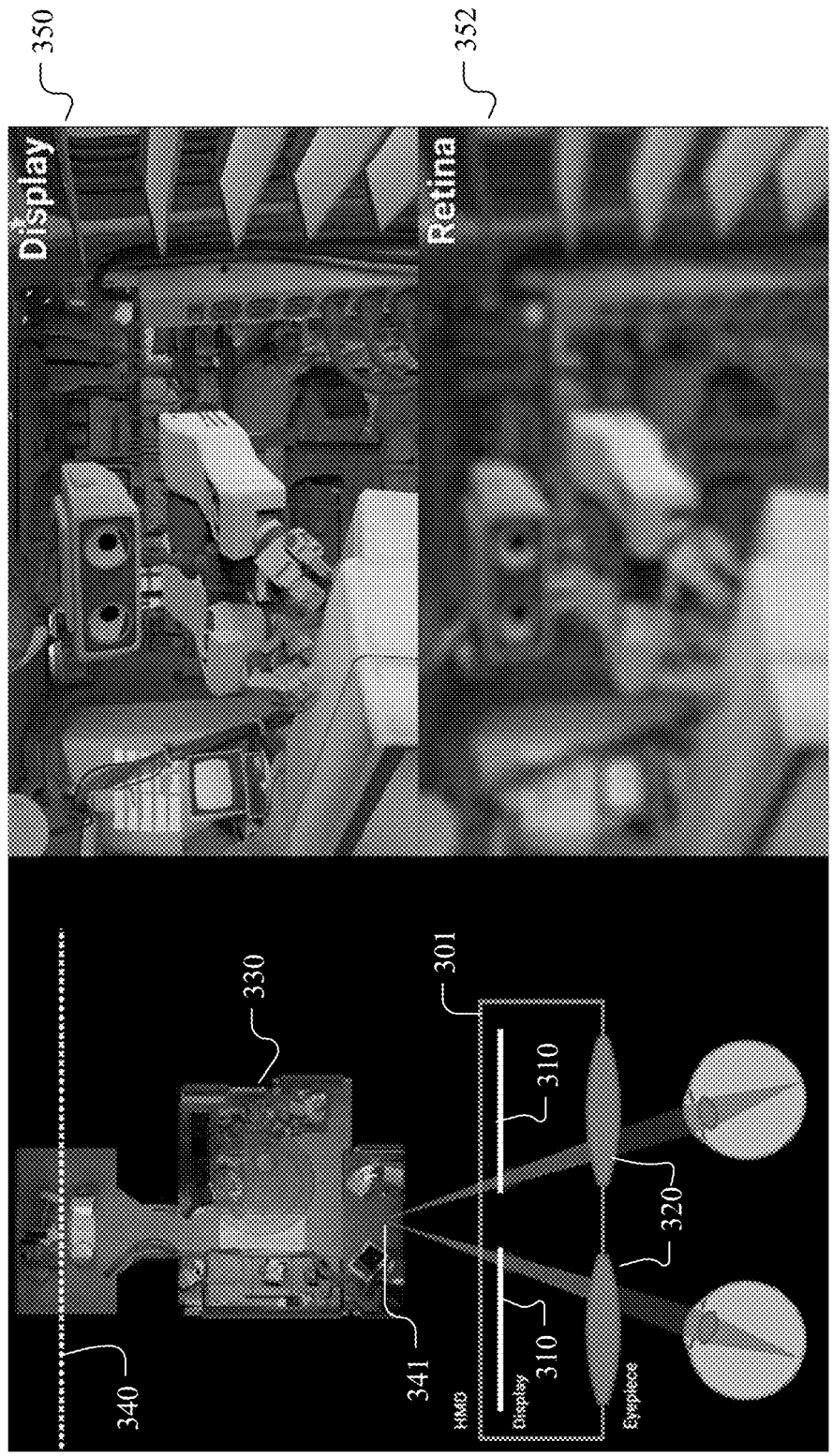

Particular embodiments described herein are designed to generate images with defocus blur effects for varifocal displays and EDoF displays. Most HMDs, such as the HMD 301 shown in FIG. 3A, have a simple construction: a physical display 310 is positioned within the focal length of an eyepiece 320 to create a virtual image at a fixed distance. The display 310 may present the user with an image of a 3D virtual scene 330, and the user may choose to focus on a particular focal surface. In FIG. 3A, the user's eyes are focusing on the focal surface 340 in the virtual scene 330. Even though the eyes of the user are not focused on the physical display 310, the eyepiece 320 helps direct the user's focus onto the display. As such, what the user sees (e.g., image 351) will correspond to what is displayed (e.g., image 350). However, as shown in FIG. 3B, when the user focuses on a near object 341 in the virtual scene 330, the fixed eyepiece 320 continues to be focused at plane 340. As a result, the user's focus through the eyepiece 320 is no longer on the physical display 310. This results in the user's view 352 appearing out-of-focus, even though the image 350 being displayed is in-focus. This is due to vergence-accommodation conflict between the user's focus and the fixed focus of the HMD.

Figure 4B:
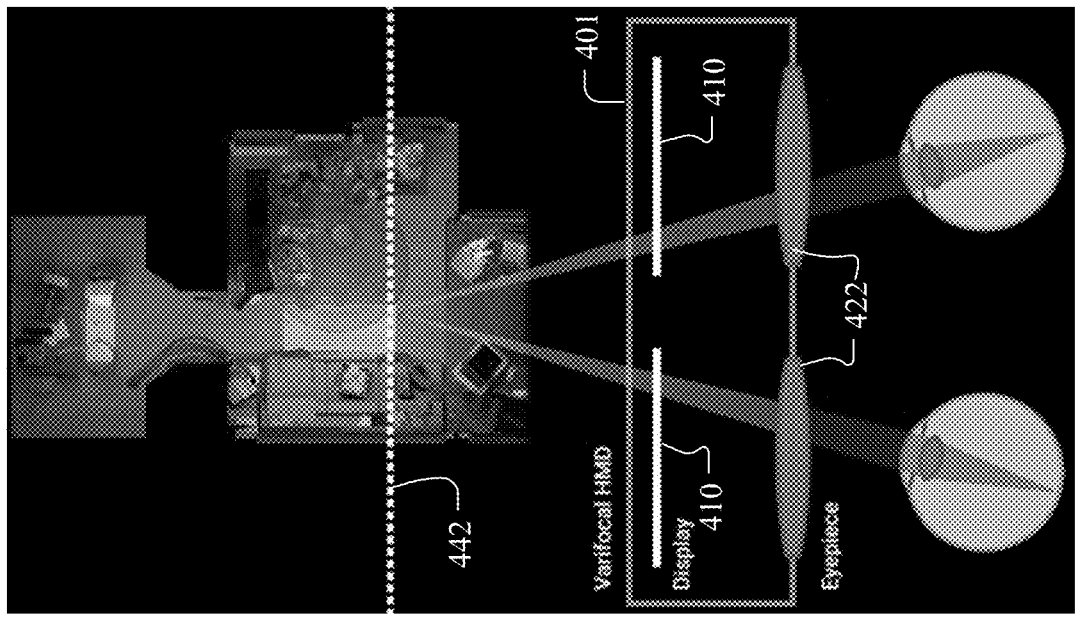
FIGS. 4A-B illustrate an example of a varifocal HMD, an image displayed thereon, and the image as seen by a user based on his/her focus.
Figure 4A:
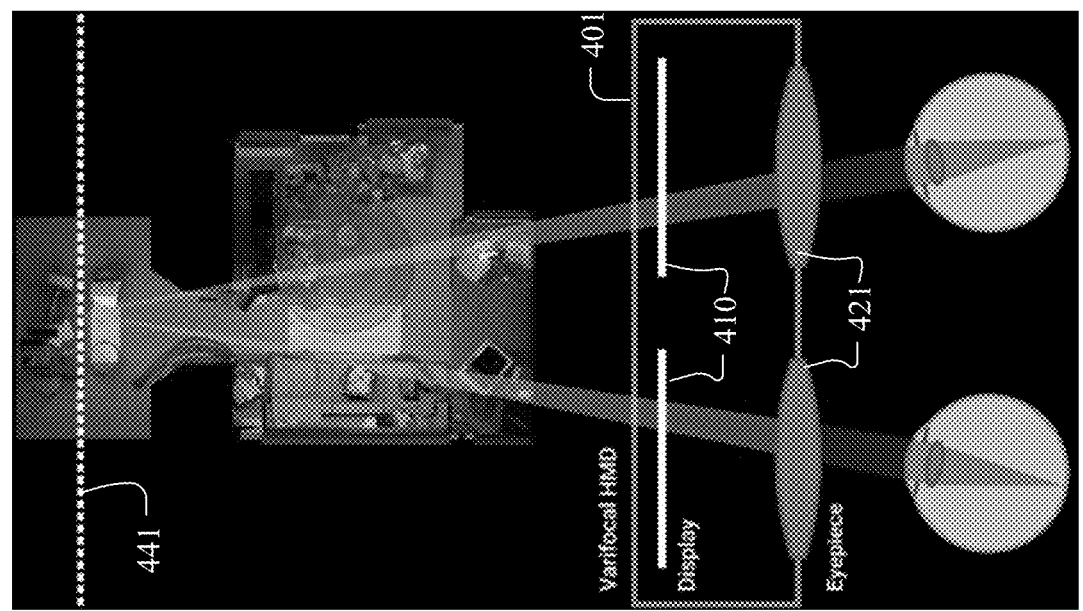

Varifocal HMDs can resolve vergence-accommodation conflicts by adjusting the headset's focus based on eye tracking. FIG. 4A illustrates an example of a varifocal HMD 401, which has a physical display 410 and an adjustable eyepiece in a first configuration 421. When the user is focusing on a distant point 441, the eyepiece deforms to the first configuration 421 to match the user's accommodation, resulting in the display 410 being in-focus. When the user focuses on a closer point 442, as shown in FIG. 4B, the eyepiece deforms to a second configuration 422 to match the user's new accommodation. This again results in the display 410 being in-focus. In other words, the eyepiece or lens of a varifocal HMD are translated to alter the image distance. When coupled with eye tracking, varifocal HMDs extend the depth of focus. Alternatives to lens movement include electronically tunable lenses, deformable membrane mirrors, mechanically translated mirrors, among others. Varifocal HMDs are not the only means to extend depth of focus. Certain accommodation-invariant HMDs use pinhole apertures and electronically tunable lenses to minimize variation of the point spread function as the user accommodates.

Since a varifocal or EDoF HMD causes the physical display of the HMD to always be in-focus, whatever is displayed would be what the user sees. This means that in order for the user to see defocus blur, varifocal and other EDoF HMDs must rely on rendered synthetic defocus blur, as points in the virtual scene will not project with perceptually correct retinal blur. As a result, delivering correct accommodation cues with such HMDs requires not only hardware innovation, but also the development of real-time rendering of defocus blur.

As discussed, rendering accurate defocus blur may be useful for properly driving accommodation in near-eye displays. However, existing methods for faithfully rendering defocus blur are either prohibitively expensive or fail to approximate the blur. Embodiments described herein provide a machine-learning-based approach to solving the problem and providing accurate, realistic defocus blur with sufficiently fast inference time to accommodate real-time applications.

Figure 5:
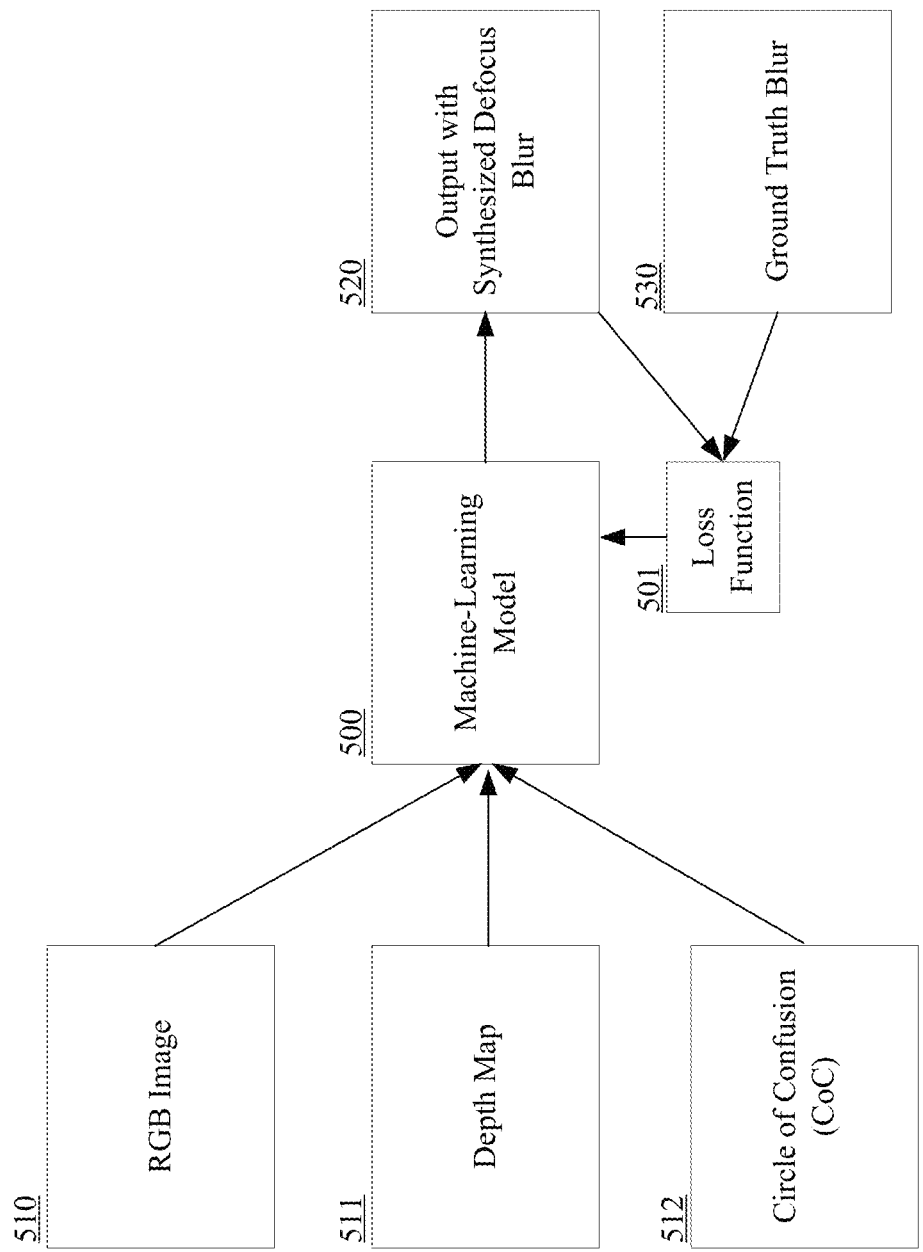
FIG. 5 illustrates a block diagram of a machine-learning model configured to synthesize a gaze-contingent defocus blur images from RGB-D inputs.

FIG. 5 illustrates a block diagram of the machine-learning model 500 (e.g., using the network architecture described above) configured to synthesize a gaze-contingent defocus blur images from RGB-D inputs. Particular embodiments of the machine-learning model 500 may take a single, all-in-focus RGB-D image as input (e.g., color image 510 and depth map 511, represented by variables x and d, respectively), which is typically available at no additional cost in any game or computer-graphics engine, and generate a high-quality defocus blur image 520 as an output. As present herein, depth values are in units of inverse meters (diopters), abbreviated "D." In addition to the color 510 and depth maps 511, the machine-learning model 500, in particular embodiments, is assisted by a third input: a circle of confusion (CoC) map 512 (represented by the variable c and alternatively referred to as a defocus map). The circle of confusion, in particular embodiments, is the shape of the blur on the retina, with a diameter (roughly) proportional to the absolute difference (in diopters) between the image depth and the plane of focus. Although in particular embodiments the CoC or defocus pattern may be a circle, the pattern may alternatively be defined as any arbitrary shape, including a hexagon, octagon, or even the shape of a star or heart. Once generated, the CoC map encodes the desired focal surface of the output (the focal surface could be a flat plane as well as a varying, contoured surface). Although in certain embodiments the information encoded by the CoC map may be learned by the network, the complexity of the network may be reduced in other embodiments by applying a simple per-pixel preprocessing to generate the CoC map. Details on this CoC calculation are presented below. In particular embodiments, the output (represented by the variable y=CNN (x, d, c)) of the network 500 is the defocus blur image 520 at the focal distance provided by the input CoC image 512. For example, if the CoC image 512 represents what is seen at 2.2 diopters, the machine-learning model 500 would learn to generate an output image 520 with synthesized defocus blur that one would expect to see at 2.2 diopters. During each training iteration, the output image 520 may be compared with a ground truth image 530 with the desired blur at the particular distance (e.g., 2.2 diopters, if extending the previous example). In particular embodiments, the synthesized output image 520 may be compared to the ground truth image 530 using a loss function 501. An optimization of that loss function 501 may then be the basis for updating the parameters of the machine-learning model 500 to improve its results. In particular embodiments, the training loss may be a weighted sum of the peak signal-to-noise ratio (PSNR) of the output intensity y and the image gradients $\nabla_{1,2}$ y. The training loss may be more formally defined, in particular embodiments, as: PSNR(y)+0.5 (PSNR($\nabla_1$y)+PSNR ($\nabla_2$y)).

In particular embodiments where the goal is to generate defocus blur due to the characteristics of a human's eye, a human eye model may be used to compute the circle of confusion c, which assumes a thin lens camera model with aperture diameter (e.g., typical pupil diameter) A=4 mm, distance between lens and film/sensor (typical distance between pupil and retina) s=17 mm and pixel size around 0.68 milliradian. The camera's focal length f (which is a measure of how strongly the lens converges light) depends on the focal distance q (i.e., the distance between the lens and the subject that the lens is focused on). For eyes, the focal length could change as the eye lens changes shape to focus at different depths. The focal length f is given by the following formula, for example:

$$f = 1 \bigg/ \left( q + \frac{1}{s} \right), \qquad (1)$$

The CoC image may be calculated per-pixel (with corresponding depth d based on the depth map) by:

$$c = A \left| \frac{f - d}{f - q} - 1 \right|. \qquad (2)$$

The embodiments described above for generating defocus blur for near-eye displays (e.g., artificial reality HMDs) may be modified to generate defocus blur for traditional two-dimensional flat-screen displays, such as television or computer monitors, cinema screens, mobile phones, tablets, signage displays, etc. In such cases, the desired defocus-blurring effect may be attributed to the parameters of the camera's lens rather than the human eye. Such difference may be accounted for by altering the parameters used for computing the CoC. For example, the aperture diameter A used in the calculation may be set to reflect the aperture of the desired camera (rather than the typical pupil diameter of a person). Similarly, the s distance between the lens and film/sensor may be set to reflect such parameter of the desired camera (rather than the typical distance between a person's pupil and retina). By adjusting the CoC computation in this manner, the resulting defocus-blurring effect could be adjusted to appear as if it were generated by a camera with those parameters and displayed on any device, including near-eye displays and traditional flat-screen displays.

Figure 6:
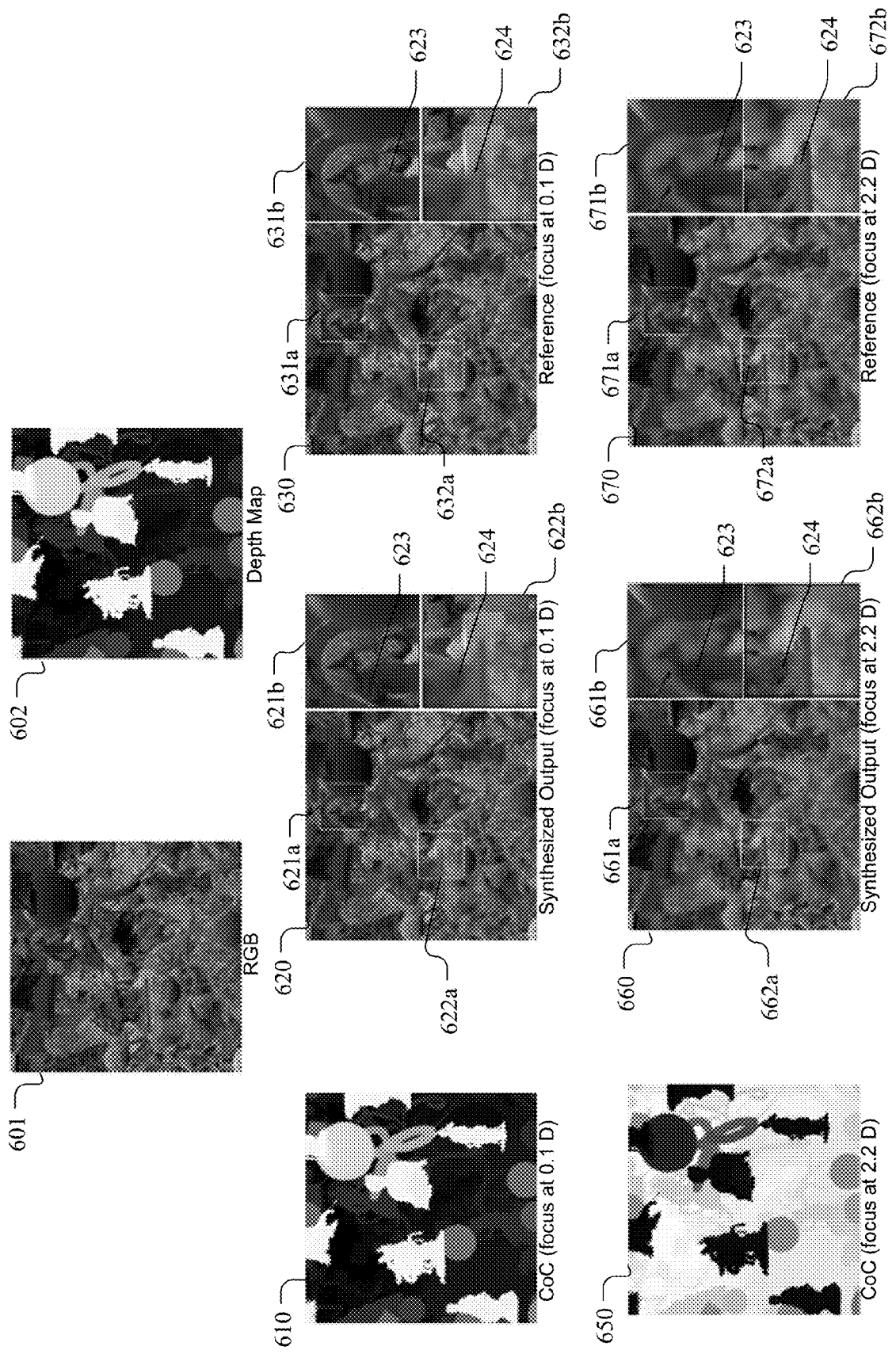
FIG. 6 an example training sample from a training dataset used for training the machine-learning model.

FIG. 6 illustrates an example training sample from a training dataset used for training the machine-learning model 500. The training sample includes the input RGB 601 and depth map 602. In particular embodiments, the network may accept an additional input: the circle of confusion (CoC) map, which may be associated with particular depth values. The CoC map may be evaluated for an ideal thin-lens camera, using the accommodation distance and the pupil diameter, as described above. Accommodation distance may be measured in units of inverse meters (diopters), abbreviated "D". For example, "near" and "far" focus is at 2.2 D and 0.1 D, respectively. The CoC 610 is for a focus at 0.1 D and the CoC 650 is for a focus at 2.2 D. In practice, for a varifocal HMD, the CoC map is gaze-contingent. In the example shown, objects that are closer to the plane of focus are darker in color in the CoC map. For example, as shown in the 0.1 D CoC 610 ("far" focus), objects towards the back (in terms of depth) are darker since they are closer to the focal surface, whereas objects in the foreground are lighter/white. In contrast, when the focus is shifted closer, as shown in the 2.2 D CoC map 650, the closer objects become darker and the more distant objects relative to the focal surface appear lighter.

The machine-learning model (e.g., model 300 in FIG. 3) may be trained based on the input color image RGB 601, depth map 602, and CoC map 610, 650. During an iteration of the training, the machine-learning model may generate a synthesized output that corresponds to the focus distance of the CoC. For example, based on the inputs of RGB image 601, depth map 602, and CoC 610 (focus at 0.1 D), the machine-learning model may generate synthesized output 620 with synthesized defocus blur. This output 620 may be compared to the "ground truth" or reference blur 630, which may be produced by path tracing using the Houdini renderer in particular embodiments. To allow for better examination of the details, FIG. 4 shows zoomed-in views 621b and 622b of portions 621a and 622a of the synthesized output 620, respectively. The zoomed-in view 621b includes an object 623 that is distant, and as such it appears relatively sharper since the focus of the CoC 610 is far (namely, at 0.1 D in this example). In contrast, a relatively closer object 624 shown in the zoomed-in view 622b is blurry, which is the expected blurring effect since it is distant from the focal surface. The synthesized output 620 and the ground truth 630 associated with the training sample have visibly similar characteristics. The ground truth 630 shows zoomed-in views 631b and 632b of portions 631a and 632a of the ground truth 630, respectively. The objects 623 in the zoomed-in view 631b appears in-focus, and the object 624 in the zoomed-in view 632b appears out-of-focus, similar to how those objects 623, 624 appear in the synthesized output 620.

As another example, the machine-learning model may also generate a synthesized output 660 based on the "near" CoC 650. This output 660 may be compared to the "ground truth" or reference blur 670, which again may be produced by path tracing using the Houdini renderer in particular embodiments. To allow for better examination of the details, FIG. 4 shows zoomed-in views 661b and 662b of portions 661a and 662a of the synthesized output 660, respectively. The zoomed-in view 661b includes the far object 623. Although the far object 623 appeared in-focus in the synthesized output 620 based on the far CoC 610, the object now appears out-of-focus in the synthesized output 660, which is the desired result since output 660 was generated based on a closer CoC 650. The closer object 624, which appeared out-of-focus in the synthesized output 620 that was generated based on the far CoC 610, appears in-focus in the synthesized output 660 that was generated based on the close CoC 650. This again is the desired and expected result. The synthesized output 660 and the ground truth 670 associated with the training sample have visibly similar characteristics. The ground truth 670 shows zoomed-in views 671b and 672b of portions 671a and 672a of the ground truth 670, respectively. The objects 623 in the zoomed-in view 671b appears out-of-focus, and the object 624 in the zoomed-in view 672b appears in-focus, similar to how those objects 623, 624 appear in the synthesized output 660.

Figure 7A:
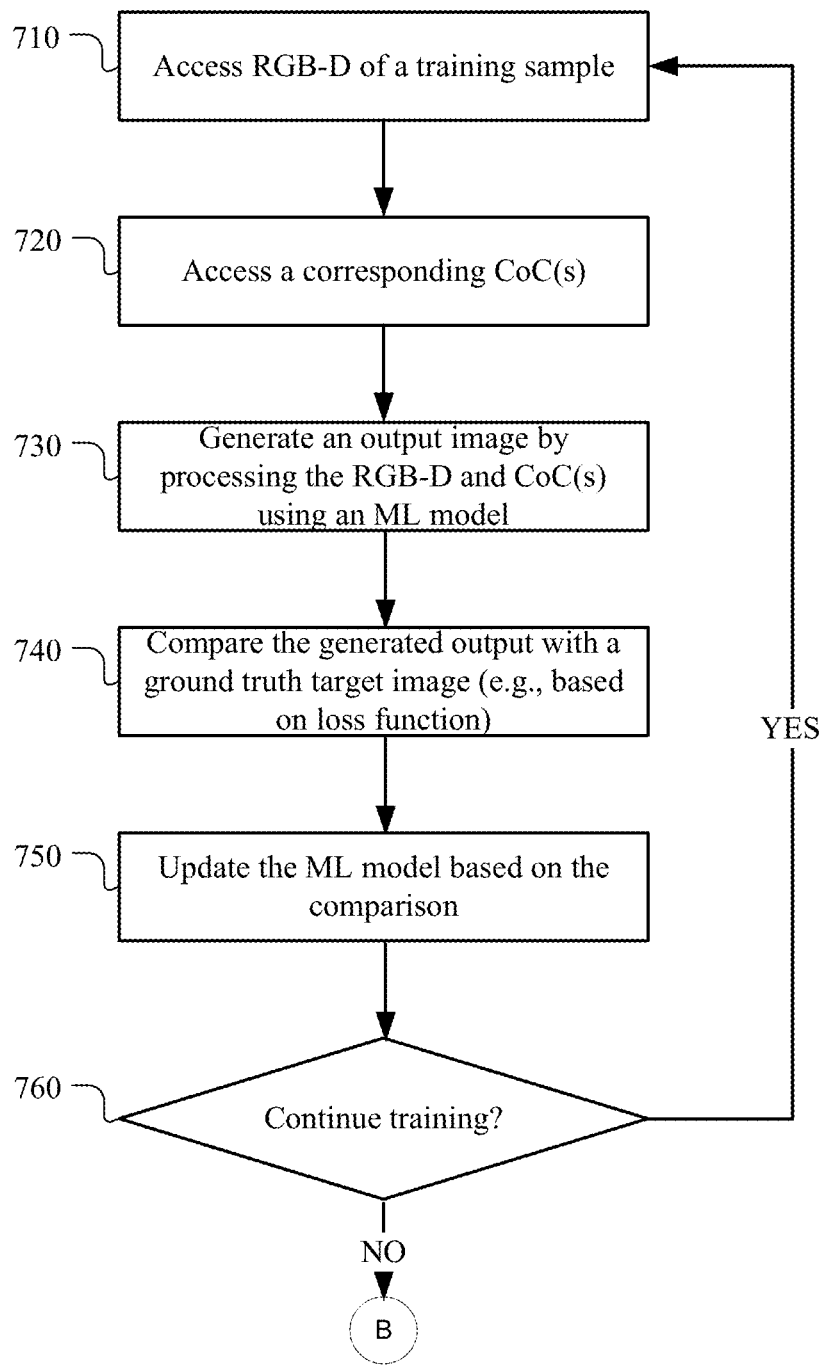
FIG. 7A illustrates an example method for training a machine-learning model to generate an image with synthesized defocus blur.

FIG. 7A illustrates an example method 700 for training a machine-learning model to generate an image with synthesized defocus blur. The method may begin at step 710, where a computing system used for training the model may access a training sample from a training dataset. The training sample may include a training image of a scene (e.g., with color information from multiple different color channels, such as red, green, and blue) and a corresponding depth map of the scene. In particular embodiments, each object in the scene may be in-focus in the training image and the corresponding depth map.

At step 720, the system may access a circle-of-confusion map for the scene depicted in the training image. In particular embodiments, a single circle-of-confusion map may be used to represent the defocus effect of every color channel of the image (e.g., red, green, and blue). This may be appropriate in scenarios where an assumption of uniform defocus effect for different chromatic characteristics holds, or where such an approximation is suitable or desirable (e.g., to save on computation). The circle-of-confusion map may be generated based on the depth map and encodes a desired focal surface in the scene (e.g., based on a focal surface at 0.1 D, 2.2 D, or any other desired depth). In particular embodiments, the depth map may include a plurality of depth pixels, each of which encoding depth information of a corresponding color pixel in the training image (e.g., the depth pixel at a given x-y coordinate in the depth map corresponds to the depth information of the color pixel at the same x-y coordinate in the training image). In particular embodiments, the circle-of-confusion map comprises a plurality of circle-of-confusion pixels that correspond to the plurality of depth pixels, respectively (e.g., the circle-of-confusion pixel at a given x-y coordinate in the circle-of-confusion map corresponds to the depth pixel at the same x-y coordinate in the depth map). In particular embodiments, each of the circle-of-confusion pixels may be computed based on (1) the corresponding depth pixel and (2) an aperture (A) and a focal length (f) of a virtual camera model. In particular embodiments, the circle-of-confusion map may have been pre-generated and stored with the training sample (along with the corresponding RGB color and depth map data). In other embodiments, the circle-of-confusion map may be generated during training, such as after step 710. In either case, particular embodiments may access the generated circle-of-confusion map (whether pre-generated or generated during training) to train the machine-learning model.

At step 730, the system may generate an output image by processing the training image, the corresponding depth map, and the corresponding circle-of-confusion map using a machine-learning model. In particular embodiments, the machine-learning model may be configured to jointly process all color channels in the training image, along with the depth map and the circle-of-confusion map, in one pass to generate the output image. Those inputs are provided to a convolutional neural network of the machine-learning model, as described above, and the current network would process the information based on its current state or parameters to generate an output image. At the end of the current training iteration, the model may be updated as described in further detail below. During the next training iteration, the updated model would be used to generate the output image based on the next training sample, and so on. It should be noted that, while in this example the process is described as using one training sample per iteration, one of ordinary skill in the art would recognize that multiple samples (e.g., 2, 4, 9, or 16 samples) may be concurrently used in each training iteration.

At step 740, the generated output image may be compared with a target image (or "ground truth") associated with the training sample. The target image may depict the scene with a desired defocus-blur effect. In particular embodiments, the target image with the desired defocus-blur effect may be generated by path tracing using a predetermined focal length (e.g., 0.1 D, 2.2 D, etc.). The comparison may be based on a loss function, as described elsewhere herein. Based on the comparison, the system may, at step 750, update the machine-learning model. In particular embodiments, the updates are made in an effort to optimize the loss function or to minimize the difference between the generated output image and the target image.

At step 760, the system may determine whether to continue training, which may be based on predetermined termination rules. In particular embodiments, training may terminate once a predetermined number (e.g., 1000, 10,000, etc.) of training samples have been used to train the model. In particular embodiments, training may terminate once the training samples in the training dataset have all been used to train the model. In particular embodiments, training may terminate when the loss comparison is sufficiently small or below a predetermined threshold. If the system determines that training should continue, the process may repeat from step 710. If instead, the system determines that training should terminate, training would terminate. The trained model is configured to generate images with defocus-blur effect based on input images and corresponding depth maps. In particular embodiments, the generated images may be used for varifocal near-eye displays.

Figure 7B:
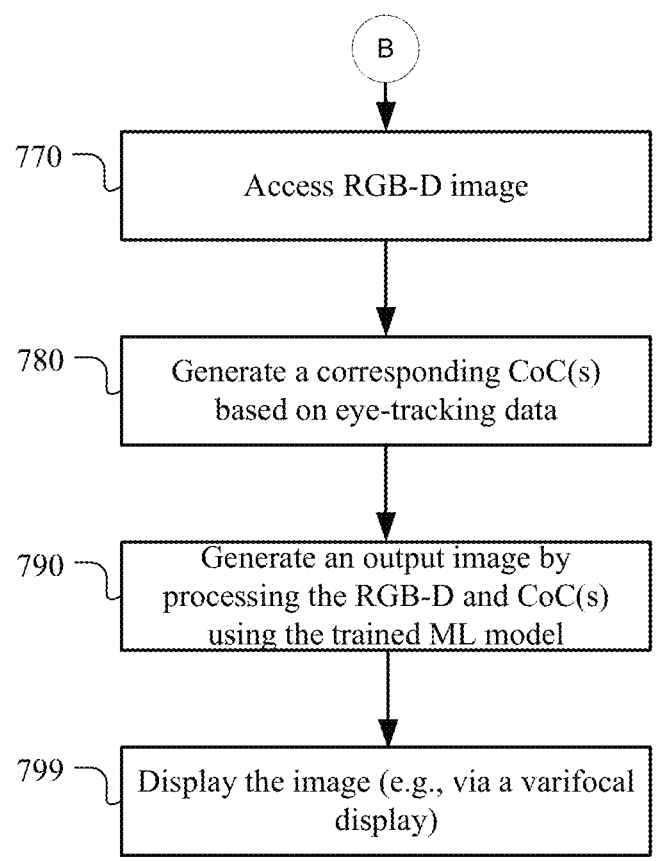
FIG. 7B illustrates an example method 701 for using a trained machine-learning model to generate an image with synthesized defocus blur at inference time.

FIG. 7B illustrates an example method 701 for using a trained machine-learning model to generate an image with synthesized defocus blur at inference time. The trained machine-learning model may be provided to or downloaded by any computing system (e.g., an end user's device, such as a smartphone, virtual reality system, gaming system, etc.). The method may begin at step 770, where the computing system may access an RGB-D image. This image (which may be a video frame) may be provided by, for example, a gaming engine or any other application that wishes to add realistic defocus-blurring effect to the image. At step 780, the system may generate a corresponding circle-of-confusion map using, for example, equation (2), described above. In particular embodiments, the CoC map may be considered as a transformation of the depth map based on current eye-tracking data (e.g., indicating where the user is looking) that is provided by the eye tracker of the varifocal HMD. For each point (pixel) in the depth map, the system may compute (e.g., in accordance with equation (2)) a corresponding CoC value based on where that point is relative to where the user is looking. At step 790, the system may generate an output image by processing the RGB-D and CoC map using the trained machine-learning model. Then at step 799, the system may display the output image via the computing system's display, such as a varifocal display.

Particular embodiments may repeat one or more steps of the methods of FIGS. 7A-7B, where appropriate. Although this disclosure describes and illustrates particular steps of the methods of FIGS. 7A-7B as occurring in a particular order, this disclosure contemplates any suitable steps of the methods of FIGS. 7A-7B occurring in any suitable order. Moreover, although this disclosure describes and illustrates example methods for synthesizing defocus blur including the particular steps of the methods of FIGS. 7A-7B, this disclosure contemplates any suitable methods that include any suitable steps, which may include all, some, or none of the steps of the methods of FIGS. 7A-7B, where appropriate. Furthermore, although this disclosure describes and illustrates particular components, devices, or systems carrying out particular steps of the methods of FIGS. 7A-7B, this disclosure contemplates any suitable combination of any suitable components, devices, or systems carrying out any suitable steps of the methods of FIGS. 7A-7B.

The embodiment described above with reference to FIGS. 7A-7B configures the machine-learning model to jointly process the color channels of an image (e.g., the red, green, and blue channels) along with a single corresponding circle-of-confusion map to generate the output image. As discussed above, such an embodiment may be suitable where it is acceptable for the defocus effect to be uniform across different color channels. Uniformity of the defocus effect may not always be suitable or desirable, however, since colors with different wavelengths may have different focal distances and other chromatic characteristics. As such, in particular embodiments, an input may include an image with three color channels, a single depth map to describe the geometry of the scene, and separate circle-of-confusion maps, rather than a single one, to represent the defocus effects of different color channels. The user is afforded the flexibility to define the circle-of-confusion maps in any desirable way (e.g., the circle-of-confusion maps for the different color channels may be different, the same, or partially the same). As an example, the machine-learning model may be configured to jointly process the red, green, and blue channels of the input image along with three corresponding circle-of-confusion maps (e.g., one for the red channel, one for the green channel, and one for the blue channel) and generate the output defocus blurring effect therefrom. The output image, which may include all three color channels, may be generated by the machine-learning model in one pass.

In yet another embodiment, the machine-learning model may be configured to separately process the input information of each color channel and combine the outputs to generate the final image. For example, the machine-learning model may be configured to process just the color information of the red channel and the corresponding circle-of-confusion map for the red channel to generate a red image with the appropriate defocus blur. Separately, the machine-learning model may process just the color information of the green channel and the corresponding circle-of-confusion map for the green channel to generate a green image with the appropriate defocus blur. Similarly, the machine-learning model may separately process just the color information of the blue channel and the corresponding circle-of-confusion map for the blue channel to generate a blue image with the appropriate defocus blur. The generated red, green, and blue images, each with its own defocus blurring effect (customized by the different circle-of-confusion maps), may then be combined to form a single output image with all three color channels.

Figure 8:
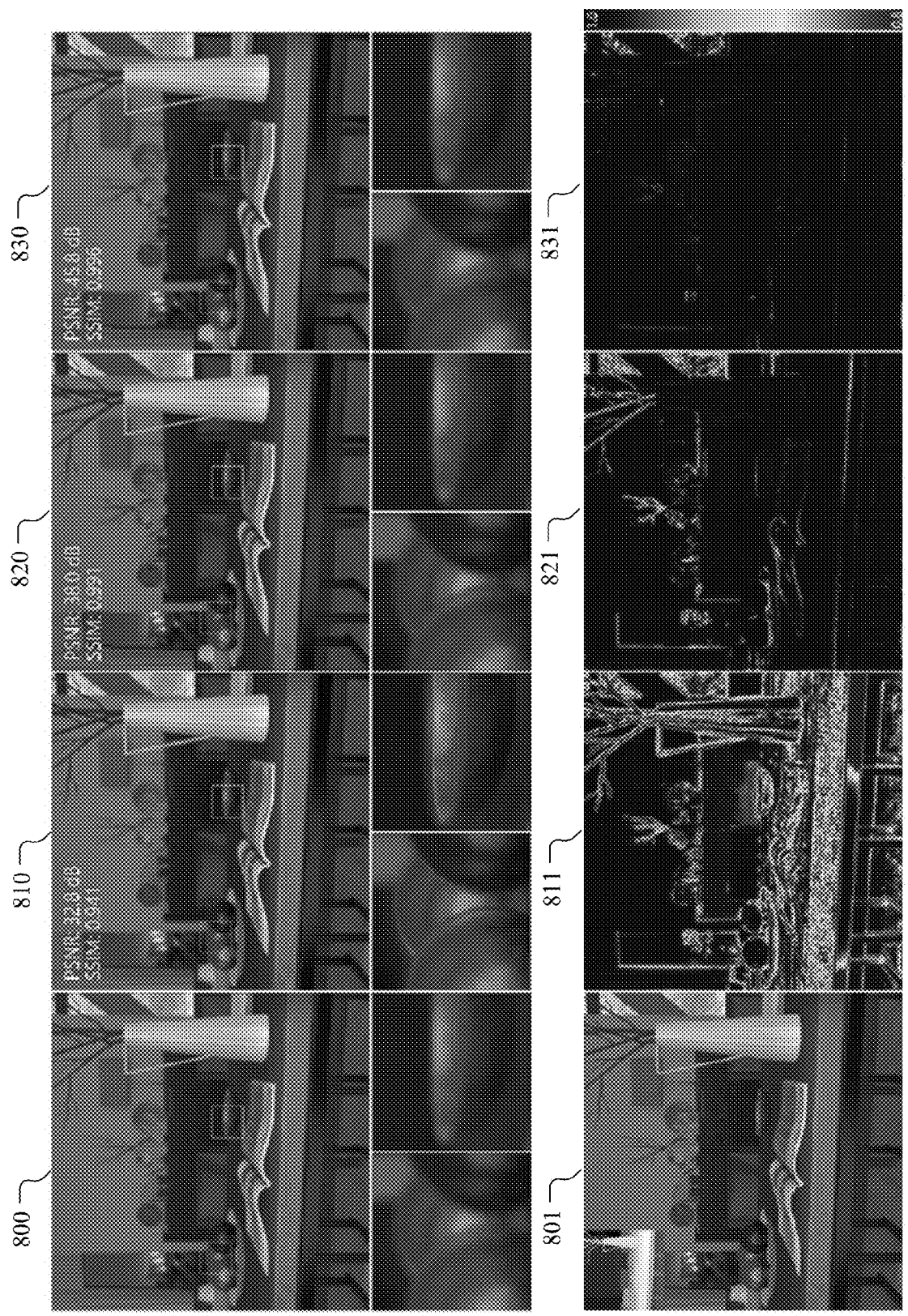
FIG. 8 illustrates example results from particular embodiments compared to prior methods.

In particular embodiments, the machine-learning model may alternatively be configured to process stereo input images and generate defocus blur for the stereo images simultaneously. For example, the machine-learning model may be configured to simultaneously process input information for the left eye/display and input information for the right eye/display and generate corresponding left and right images with the appropriate defocus blurring effect. In particular embodiments, the input may comprise two images (each with three color channels) for the two different views and a depth map describing the geometries in the scene. In particular embodiments, the machine-learning model may be configured to process each image in any manner described above. For example, each image may be processed with a single circle-of-confusion map or three circle-of-confusion maps (one for each color channel). The color channels of each image may also be processed jointly or separately. During training, each generated pair of stereo images may be compared with a corresponding pair of ground-truth or target images and, based on the comparison results, the machine-learning model may be updated (e.g., via backpropagation). Once trained, the machine-learning model may be used to generate defocus blur for stereo images simultaneously. One benefit of doing is to reduce runtime computation, since stereo pairs can be generated by the machine-learning model more efficiently (i.e., the runtime for generating a stereo pair simultaneously is less than the runtime for generating the pair separately). Another benefit of configuring the machine-learning model to process a pair of stereo images concurrently is that more information is available for generating the defocus blurring effect. For example, since stereo images capture a scene from different viewpoints, the information available is more than the information provided by each image individually (e.g., certain portions of the scene may be occluded or cut-off by the field of view of one image, but those portions may be captured in the other image). As such, the machine-learning model would have more information available to it to render the desired blurring effect. FIG. 8 illustrates example results from particular embodiments compared to prior methods. The first column 800 is the reference image (along with zoomed-in views of particular portions), the second column 810 is generated using one existing approach, the third column 820 is generated using a second existing approach, and the fourth column 830 is generated using embodiments described herein. Visually, the results in the fourth column 830, which is generated using the embodiments described herein, appear more similar to the reference 800. The improvements of the embodiments described herein are further confirmed by the PSNR metric, which shows that the PSNR of the fourth column 830 is PSNR=45.8 dB outperforms those of the two existing approaches (with PSNR=32.8 dB and 38.0 dB, respectively). The results generated by the present embodiments produce fewer visual artifacts, as assessed using the structural similarity (SSIM) index, which is visually depicted in the bottom row (image 801 is the input RGB, image 811 is the SSIM of the first existing approach, image 821 is the SSIM of the second existing approach, and image 831 is the SSIM of the result from the present embodiments). The SSIM of the results 830 generated by the present embodiments is 0.996, which is better than those of the existing approaches (with SSIM=0.941 and 0.991, respectively), even though the second approach 820 was trained under and optimized for the SSIM loss. Furthermore, while computationally efficient, typical game engine post-processed blur, such as the result 810 generated using the first existing approach (PSNR=32.8 dB, SSIM=0.941), differ significantly from the reference 800 retinal defocus, which uses physically-accurate, but off-line, accumulation buffering.

Rendering Multilayer Decompositions for Multifocal Display

Figure 9:
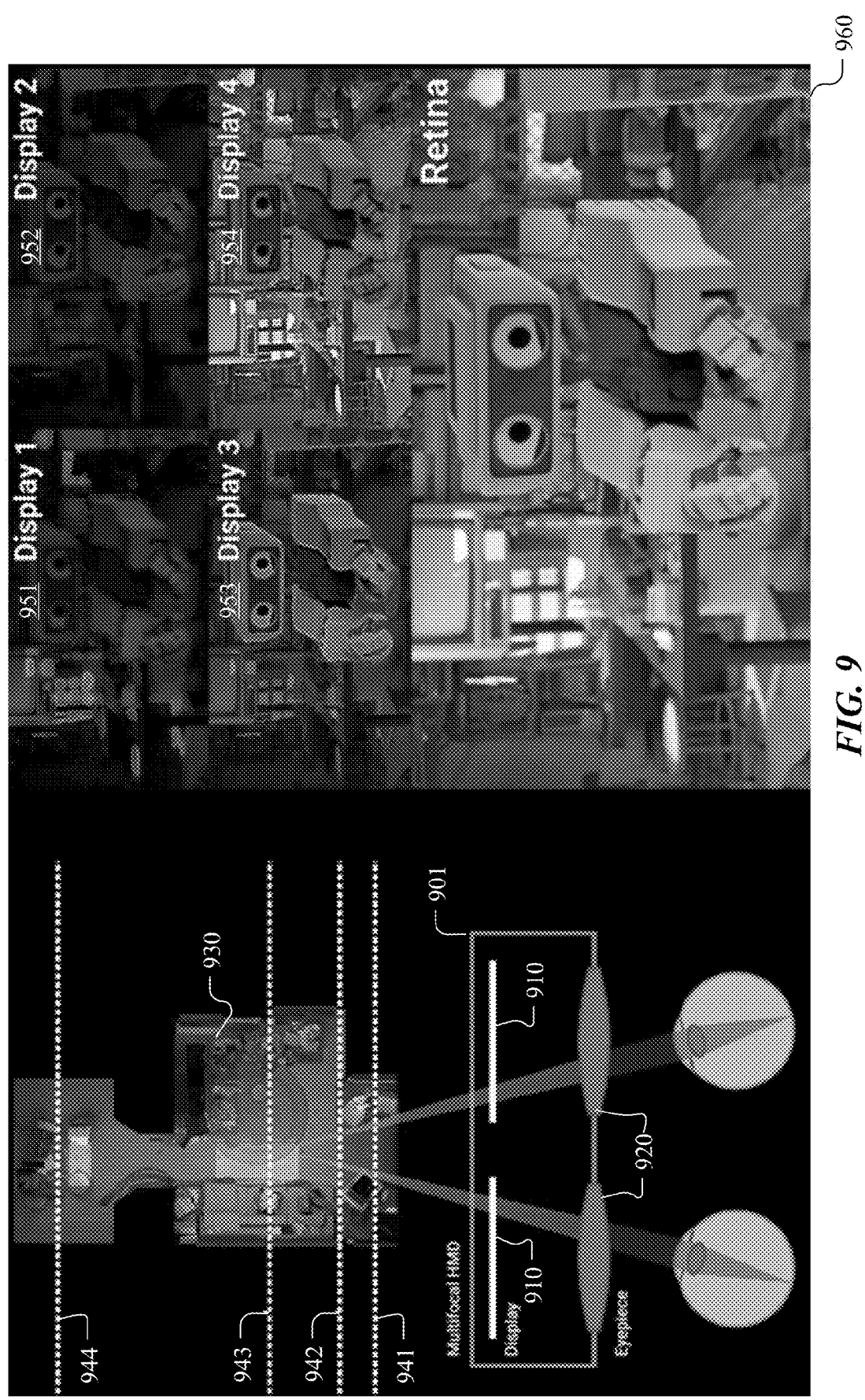
FIG. 9 illustrates an example of a multifocal HMD, multilayer decompositions displayed thereon, and an image as seen by a user based on his/her focus.

FIG. 9 illustrates an example of a multifocal HMD 901 that has a physical display 910 positioned within the focal length of an eyepiece 920. In contrast to varifocal displays, multifocal HMDs 901 are designed to eliminate the need for eye tracking. To resolve vergence-accommodation conflict, multifocal HMDs 901 often rely on temporal multiplexing: refreshing the display 910 with different images as the eyepiece's 920 focal length is rapidly modulated. For example, the display 910 of the multifocal HMD 901 may sequentially and rapidly display multiple, differently defocused images (e.g., 951-954) with corresponding changes to the eyepiece's 920 focal lengths. As the viewer accommodates in a multifocal system 901, the differently defocused images superimpose on the retina 960, thereby letting the user perceive a properly defocused virtual scene 930.

The multiple layers of images that are superimposed on the user's retina 960 generally depict the virtual scene 930 as seen from different focal lengths. For example, the first image 951 shown in FIG. 9 corresponds to the focal surface 941, and similarly the second 952, third 953, and fourth 954 images correspond to focal surfaces 942, 943, and 944, respectively. Different multifocal HMDs may predefine different numbers of such focal surfaces (e.g., three, four, seven, etc.) at different focal depths. The multifocal HMD 901 shown in FIG. 9, for example, uses four layers of images that correspond to the four predefined focal surfaces 941-944 shown.

One challenge with multilayer decomposition—where a scene is partitioned across multiple image layers—pertains to the generation of the image layers. Especially for real-time applications such as virtual reality and games, generating a single image dynamically is already computationally challenging, much less generating four (or even more). Some have used "linear blending" for this task, depicting each point in the RGB-D input on the two nearest layers. Others have used "optimized blending" to address visual artifacts produced by this method, which occur at depth discontinuities and with translucent or reflective materials. However, these benefits come at a high computational cost, with a reported runtime on the order of minutes, unsuitable for real-time applications. In contrast, embodiments described herein produce high-resolution optimized multilayer decompositions, in real-time, using learned image synthesis. Furthermore, the multilayer decompositions are generated directly from RGB-D inputs, further reducing computational overhead by eliminating focal stack rendering, which will be described in more detail below.

Figure 10:
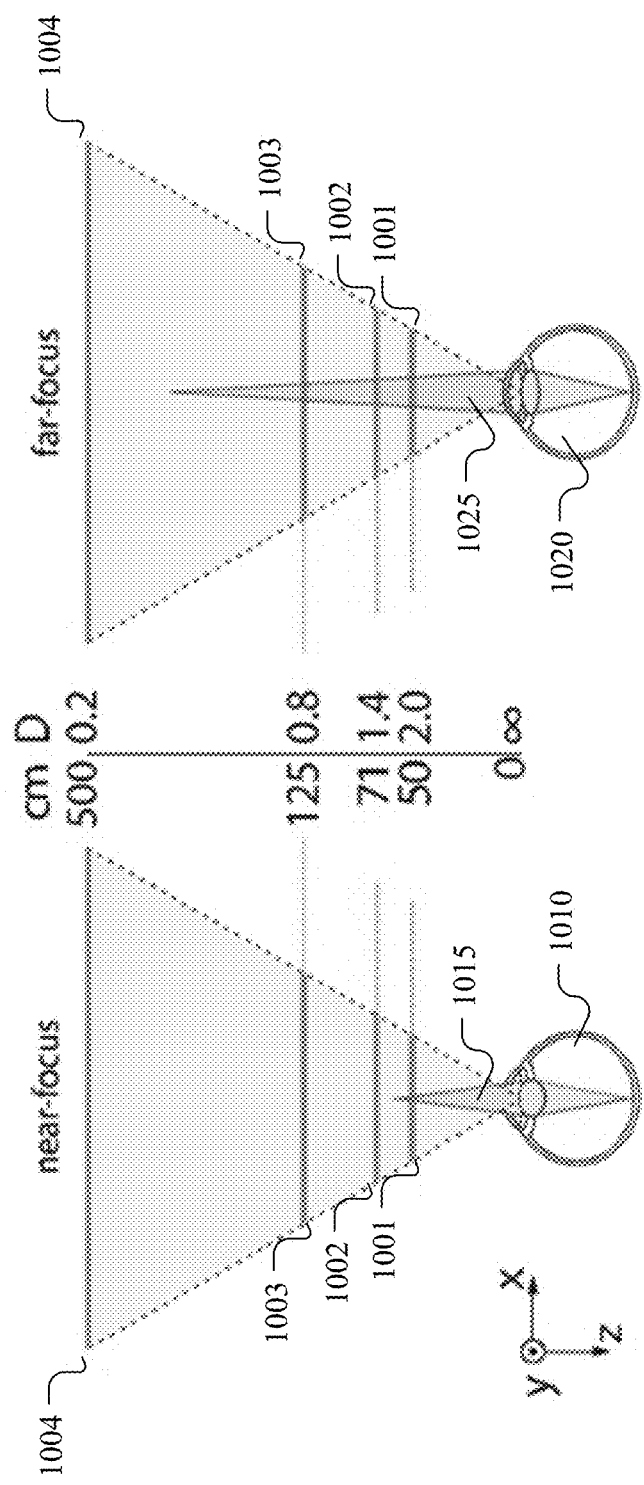
FIG. 10 illustrates an example multifocal display setup.

Particular embodiments described herein use machine learning to generate multilayer decompositions (i.e., the aforementioned layers of images that are displayed to a user and superimposed on the user's retina) for multifocal displays using a single RGB-D input. Using the multilayer decompositions, a multifocal display is able to provide viewers with images with correct defocus blur effect on the retina when the viewer accommodates to different focal distances. An example configuration is illustrated in FIG. 10. The eye 1010 on the left is shown to be focused at a near-field 1015 and the eye 1020 on the right is shown to be focused at a far-field 1025. The multilayer decomposition images corresponding to the four multifocal surfaces 1001, 1002, 1003, 1004 combine on the viewer's retina to produce an approximately accurate blur, even when the user focuses between the planes. By displaying the multilayer decomposition images corresponding to the predetermined multifocal surfaces 1001-1004 (whether concurrently via multiple display panels or sequentially via a single display panel), the multifocal HMD allows a user to perceive the appropriate defocus blur while dynamically switching focus within the entire, continuous accommodation range of the HMD.

Figure 11:
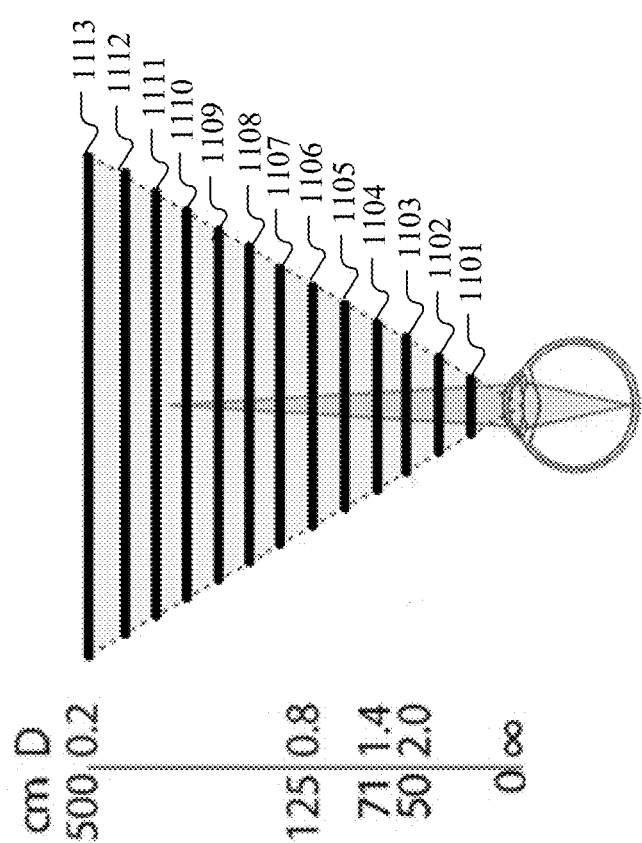
FIG. 11 illustrates an example of a focal range with multiple, discretely defined focal distances.

In particular embodiments, the multilayer decomposition images may be generated based on a focal stack, which refers to multiple images of a scene focused at different focus distances. FIG. 11 illustrates an example of a focal range with multiple, discretely defined focal distances 1101-1113. In the example shown, there are thirteen focal distances (although any other number, granularity, and/or range of focal distances may be used instead). A focal stack of a scene within the field of view may include thirteen images that correspond, respectively, to the thirteen focal distances 1101-1113. In general, for each image, objects within the scene that are close to the image's corresponding focal distance would appear in-focus, whereas objects that are distant from the focal distance would appear out-of-focus. For example, an object that is far from the viewer would appear in-focus in the image that corresponds to the farthest focal distance 1113, but it would appear out-of-focus in the image that corresponds to the closest focal distance 1101. By including the expected, accurate defocus blur of the scene at different focal distances, the focal stack provides discrete samples of how the scene should appear across a focal range.

In particular embodiments, the multilayer decomposition images for a multifocal display may be generated based on a focal stack. Formally, a multifocal display may have M display panels (or M decomposition image layers for rapid, sequential display). A multilayer decomposition image (e.g., or the corresponding the display parameters for such an image), which may be denoted by $y_i$, may correspond to or is shown on a display panel located at depth $p_i$ for $i=1, \ldots, M$. For example, in FIG. 10, the focal distance 1001 may be denoted by $p_1$ and may correspond to a decomposition image denoted by $y_1$; the focal distance 1002 may be denoted by $p_2$ and may correspond to a decomposition image denoted by $y_2$; and so on.

In particular embodiments, the relationship between multilayer decomposition images and a focal stack may be defined as follows. A focal stack of defocused images may be matched with N depths (e.g., N=13 for the focal stack associated with FIG. 11). For $j=1, \ldots, N$, $k_{ij}$ may represent the point spread function (PSF) of a pixel from display i (corresponding to the multilayer decomposition image at depth $p_i$) on the focal surface $q_j$ of the focal stack. The PSF kernel $k_{ij}$ is given by:

$$k_{ij} = circ\left(A\left|\frac{q_j}{p_i} - 1\right|\right), \quad (3)$$

where circ is the circular averaging kernel, A is the aperture, and the quantity inside the brackets is the kernel diameter. The image formed on retina when the eye focuses at depth $q_j$ may be denoted by $z_j$. The formation model of $z_j$, which conceptually aggregates or superimposes the scenes shown in the M multilayer decompositions, may be given by:

$$z_j = \sum_{i=1}^{M} k_{ij} * y_i, \quad (4)$$

where * is 2 D discrete convolution.

In particular embodiments, multilayer decomposition images may be generated from focal stacks. As previously mentioned, one of the problems of multifocal display algorithms is to solve for the display parameters, or the Multilayer decomposition images $\{y_i\}$, given a target focal stack of N images $\{\bar{z}_j\}$. Particular embodiments may optimize $\{y_i\}$ by solving the following minimization problem:

$$y_i = \underset{y_i}{\operatorname{argmin}} \sum_{j=1}^{N} \left\| \bar{z}_j - \sum_{i=1}^{M} k_{ij} * y_i \right\|_2^2, \quad (5)$$

$$\text{s.t. } 0 \leq y_i \leq 1, i = 1, 2, \ldots, M$$

Unfortunately, computationally, solving for (5) is very costly, and as such it is not practical for typical real-time, dynamic applications.

Instead of using expensive iterative optimization to solve (5), particular embodiments may employ the machine-learning network described herein to directly produce the decomposition. In particular embodiments, a first machine-learning model may be trained to render a focal stack from an RGB-D input, and a second machine-learning model may be trained to process the focal stack and generate multilayer decomposition images for a multifocal display.

With respect to generating the focal stack from an RGB-D input, efficiently rendering the focal stack involves not just the cost of producing an accurate defocus blur, but is multiplied by the number of images in the focal stack. For a focal stack of N depths, one approach would apply the network described above N times. This approach, however, may be overly costly, especially for real-time applications.

Rather than doing so, another approach, according to particular embodiments, generates the entire focal stack from an RGB-D input in a single pass, using a machine-learning model. In particular embodiments, the machine-learning model (e.g., the network shown in FIG. 2A-C or described elsewhere herein) may be configured to take an RGB-D input. The RGB-D input may be denoted by, for example, an in-focus image x with color information (e.g., RGB) and a depth map d. The model may be configured to output a focal stack, denoted $\{y'_1, y'_2, \ldots, y'_N\}$. In particular embodiments, the focal surfaces of the focal stack may be fixed and equally spaced in diopters from $d_{min}$ to $d_{max}$. In particular embodiments, the output layer of the machine-learning model may be extended to have N output images, each producing an image with fixed focal distance for each of the N equally spaced depths in $[d_{min}, d_{max}]$. In particular embodiments, the input CoC map is no longer needed, since the focal distances are fixed and the network learns separate mappings from depth to blur for each of the output channels. In other embodiments, especially those in which the focal distances of the focal stack are not fixed, the input of the model may further include measures of desired depths for the focal stack (which may be represented by CoC maps).

During training, each training sample used may include an RGB-D image, which may be associated with a ground-truth focal stack. In each training iteration, the model may output $\{y'_1, y'_2, \ldots, y'_N\}$=CNN(x, d) for each training sample. The output $\{y'_1, y'_2, \ldots, y'_N\}$ may be compared, based on a loss function, to the ground-truth focal stack (i.e., a series of N target images with the desired defocus blur at the desired focal distances) associated with that training sample and the result may be used to update the model. The training loss may be defined by, for example:

$$\sum_{i=1}^{N} (PSNR(y'_i) + 0.5(PSNR(\nabla_1 y'_i) + PSNR(\nabla_2 y'_i)))$$

Once trained, the model may be used to process an RGB-D input and output, in a single pass, a focal stack with N images, $\{y'_1, y'_2, \ldots, y'_N\}$. The generated focal stack may, in turn, be used as input for a second machine-learning model that is configured to generate multilayer decomposition images.

The second machine-learning model (which could also use the network shown in FIGS. 2A-C or other suitable models described herein) may be trained to generate M multilayer decomposition images, $\{y_1, y_2, \ldots, y_M\}$, from an input focal stack of N images, $\{y'_1, y'_2, \ldots, y'_N\}$. The input and output of the model may be denoted by: $\{y_1, y_2, \ldots, y_M\}$=CNN($\{y'_1, y'_2, \ldots, y'_N\}$). The range constraint may be strictly satisfied by the use of the Tan H activation function and rescaling at the last layer of the network, as described elsewhere herein.

Unlike the loss function described earlier, which penalized the network output directly, here the recovered image on the retinal, $z_j$ (e.g., as defined by Equation (4)), is penalized instead (since this is what the user sees). Since the images $z_1$ are linear in the display parameters $y_i$ (via Equation (4)), we can still backpropagate through this loss function during training. Conceptually, the loss function, in particular embodiments, may (1) use the generated M multilayer decomposition images, $\{y_1, y_2, \ldots, y_M\}$, to generate a recovered focal stack $\{z_1, z_2, \ldots, z_N\}$ using Equation (4); and (2) compare the recovered focal stack with a ground-truth focal stack to determine whether the defocus blur that a user would see at each focal distance is as expected. The training loss, more formally, may be defined by:

$$\sum_{j=1}^{N} (PSNR(z_j) + 0.5(PSNR(\nabla_1 z_j) + PSNR(\nabla_2 z_j)))$$

Once trained, the second machine-learning model may be used to process a focal stack input (e.g., generated by the first machine-learning model) and output, in a single pass, M multilayer decomposition images, $\{y_1, y_2, \ldots, y_M\}$. The generated multilayer decomposition images may, in turn, be displayed on a multifocal HMD.

In particular embodiments, a single machine-learning model may be trained to generate M multilayer decompositions directly from an RGB-D input. While existing multifocal decomposition methods require focal stacks to define their objective, convolutional neural networks (CNNs) do not need to evaluate the loss function at test time. As a result, the network in particular embodiments may be trained to generate display parameters $y_i$ directly from a single RGB-D image, combining both steps of focal stack rendering and multifocal decomposition. Surprisingly, this does not require increasing the network capacity, which can be explained by the similar nature of the image decomposition process required in both tasks.

Figure 12:
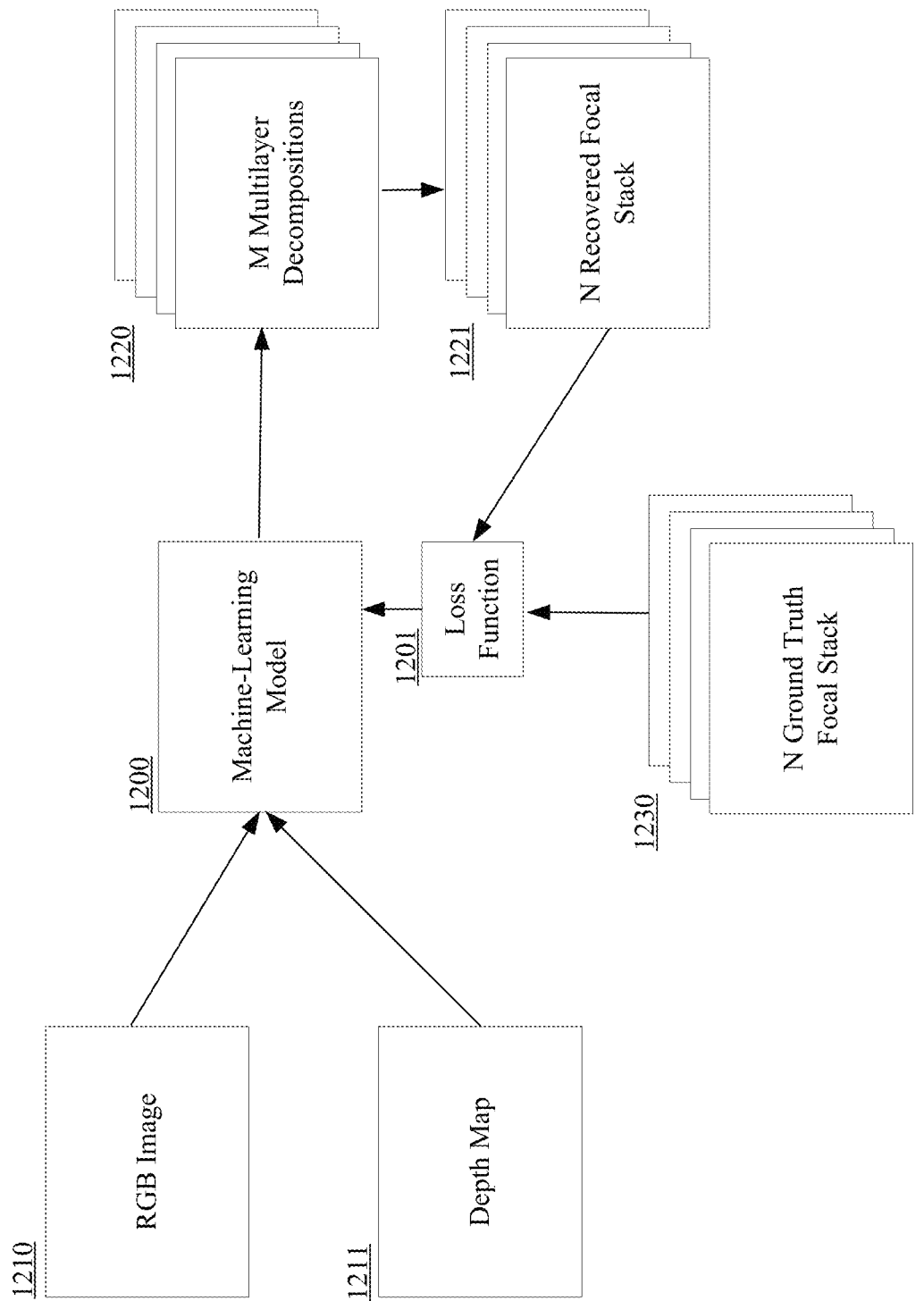
FIG. 12 illustrates a block diagram of a machine-learning model configured to generate multilayer decompositions from an RGB-D input.

FIG. 12 illustrates a block diagram of the machine-learning model 1200 (e.g., using the network architecture described above) configured to generate multilayer decompositions 1220 from an RGB-D input 1210, 1211. Particular embodiments of the machine-learning model 1200 may take a single, all-in-focus RGB-D image as input (e.g., color image 1210 and depth map 1211), which is typically available at no additional computation cost in any game or computer-graphics engine, and generate M multilayer decomposition images 1220 as output. For example, given an RGB-D input, the model may be trained to generate the four decomposition images 951, 952, 953, 954 shown in FIG. 9. During each training iteration, the output M decomposition images 1220 may be used to generate a recovered focal stack 1221 with N image layers. As described earlier, the recovered focal stack 1221 may be generated using Equation (4). The recovered focal stack 1221 may then be compared with a ground-truth focal stack 1230 with N image layers. Each image in the ground-truth focal stack 1230 may correspond to a desired focal distance (e.g., 0.1 D, 1.4 D, 2.2 D, etc.). In particular embodiments, the comparison may be performed using a loss function 1201. An optimization of that loss function 1201 may then be the basis for updating the parameters of the machine-learning model 1200 to improve its results. In particular embodiments, the training loss may be a weighted sum of the peak signal-to-noise ratio (PSNR), as defined above.

The models used in particular experiments were trained on large datasets from a path tracing renderer. A random scene generator may be used to build scenes with random object geometries and scales, textures, and materials sampled from pre-collected libraries. The objects may be randomly placed in camera's field-of-view to create complex depth and occlusion. For the network synthesizing defocus blur images, a collection of 117,502 pairs of RGB-D and ground-truth defocus blur image patches rendered by our random scene generator were used during experimentation. For the network synthesizing focal stacks and multi-layer decompositions, a collection of 5,341 focal stacks were used, each including 22 images rendered with a uniformly sampled focal distance between 0.1 D and 2.2 D. 72%, 14% and 14% of each dataset are used for training, validation and testing respectively. For the network synthesizing light fields, a collection of 3920 light fields were used during experimentation, each including 81 RGB-D images at 9×9 views. 81.25%, 12.5% and 6.25% of them are used for training, validation and testing respectively. The spatial resolution of each sample image is 128×128 pixels. Because the networks in particular embodiments are fully convolutional, they allow for images with arbitrary spatial resolution at test time. In particular embodiments, the networks may be trained with Tensorflow. In particular embodiments, the network weights may be initialized and each network may use batch size 16 with 400 epochs on the corresponding dataset at training.

Figure 13A:
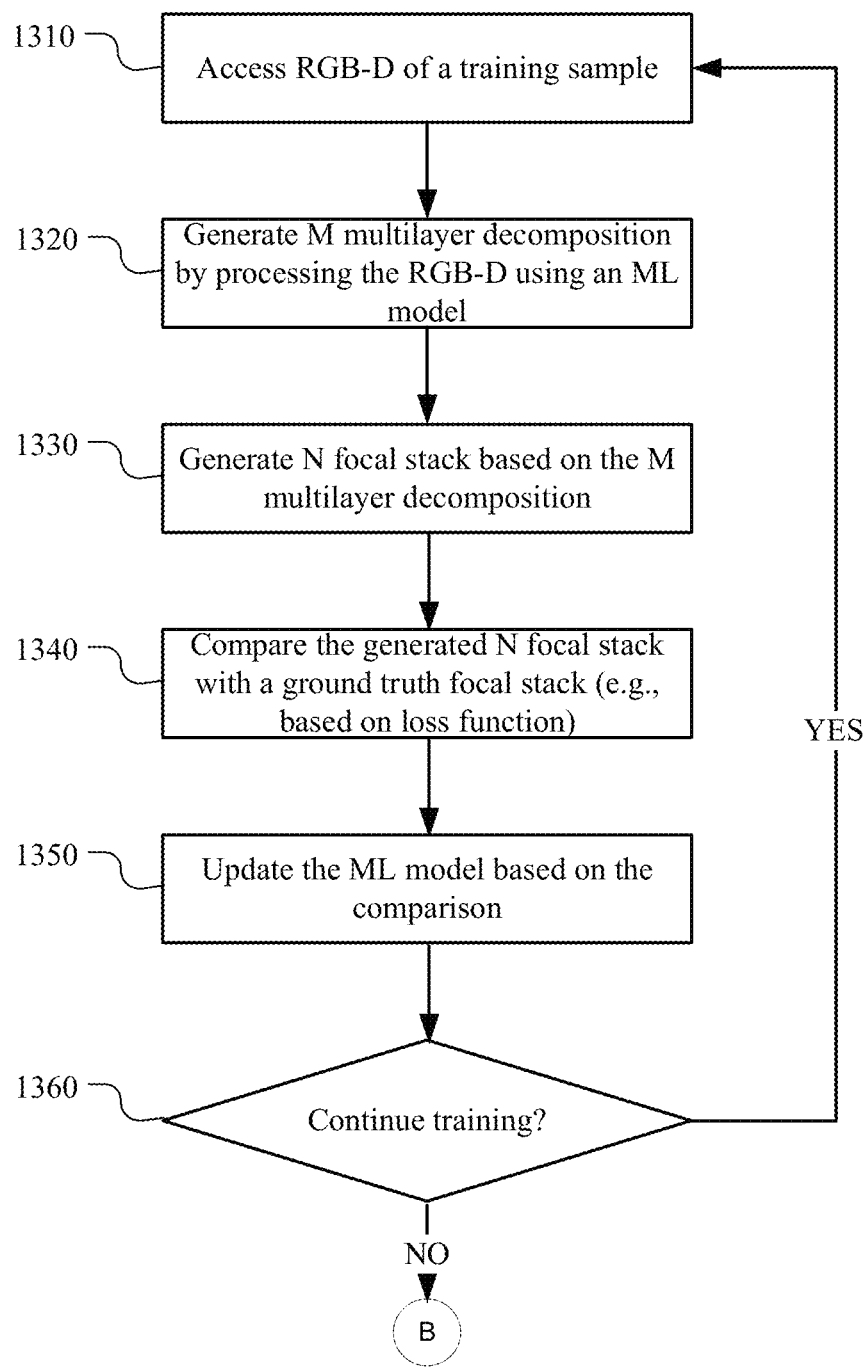
FIG. 13A illustrates an example method for training a machine-learning model to generate decomposition images with defocus-blur effect based on input images and corresponding depth maps.

FIG. 13A illustrates an example method 1300 for training a machine-learning model to generate decomposition images with defocus-blur effect based on input images and corresponding depth maps. The method may begin at step 1310, where a computing system used for training the model may access a training sample from a training dataset. The training sample may include a training image of a scene (e.g., with color information) and a corresponding depth map of the scene. In particular embodiments, each object in the scene may be in-focus in the training image and the corresponding depth map.

At step 1320, the system may generate M decomposition images by processing the training image and the corresponding depth map using a machine-learning model (e.g., such as those shown in FIGS. 2A-C). The decomposition images may be associated with different predetermined focal distances (e.g., as shown in FIG. 9). The input RGB-D may be provided to a convolutional neural network of the machine-learning model, as described above, and the current network would process the information based on its current state or parameters to generate the M output images. At the end of the current training iteration, the model may be updated, as described in further detail below. During the next training iteration, the updated model would be used to generate the M decomposition images based on the next training sample, and so on.

At step 1330, the system may generate a focal stack (the aforementioned recovered focal stack) based on the generated decomposition images. The generated focal stack may include N images, and each of the N images in the generated focal stack may be generated based on the M generated decomposition images (e.g., using Equation (4)).

At step 1340, the generated focal stack may be compared with a target focal stack (or "ground truth") associated with the training sample. The target focal stack may include multiple images associated with different predetermined focal distances (e.g., as shown in FIG. 11). Each of those images may depict the scene with a desired defocus-blur effect that is appropriate for or corresponds to the focal distance associated with that image. In particular embodiments, each image in the generated focal stack may be associated with an image in the target focal stack. For example, the generated focal stack may include N images and the target focal stack may also include N images, and there may be a 1-to-1 mapping between the images in the two focal stacks. Each pair of mapped or associated images may be associated with a common focal distance. For example, one pair of images (i.e., one from the generated focal stack and the other from the target focal stack) may be associated with the same focal distance 1101 in FIG. 11, and another pair of images may be associated with the same focal distance 1102, and so on. 8. The comparison between the generated focal stack and the target focal stack may include comparisons between the images in the generated focal stack and their respective associated image in the target focal stack. For example, the generated image associated with the focal distance 1101 may be compared with the ground-truth image associated with the same focal distance 1101, the generated image and ground-truth image associated with focal distance 1102 may be compared with each other, and so on. In particular embodiments, the comparison may be based on a loss function, as described elsewhere herein. Based on the comparison, the system may, at step 1350, update the machine-learning model. In particular embodiments, the updates are made in an effort to optimize the loss function or to minimize the difference between the generate focal stack and the target focal stack.

At step 1360, the system may determine whether to continue training, which may be based on predetermined termination rules. In particular embodiments, training may terminate once a predetermined number (e.g., 1000, 10,000, etc.) of training samples have been used to train the model. In particular embodiments, training may terminate once the training samples in the training dataset have all been used to train the model. In particular embodiments, training may terminate when the loss comparison is sufficiently small or below a predetermined threshold. If the system determines that training should continue, the process may repeat from step 1310. If instead, the system determines that training should terminate, training would terminate. The trained model is configured to generate decomposition images with defocus-blur effect based on input images and corresponding depth maps. In particular embodiments, the generated images may be used for multifocal near-eye displays.

Figure 13B:
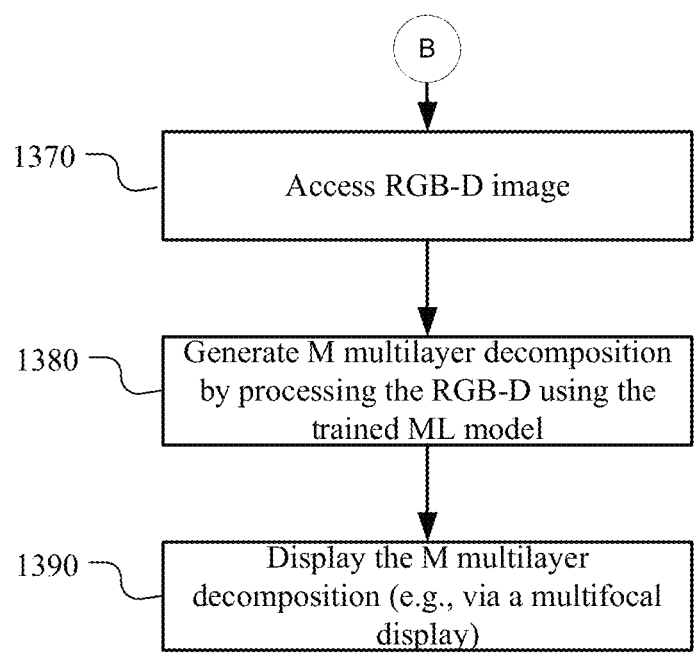
FIG. 13B illustrates an example method for using a trained machine-learning model to generate decomposition images at inference time.

FIG. 13B illustrates an example method 1301 for using a trained machine-learning model to generate M decomposition images at inference time. The trained machine-learning model may be provided to or downloaded by any computing system (e.g., an end user's device, such as a smartphone, virtual reality system, gaming system, etc.). The method may begin at step 1370, where the computing system may access an RGB-D image (e.g., one with objects that are in-focus). This image (which may be a video frame) may be provided by, for example, a gaming engine or any other application that wishes to add realistic defocus-blurring effect to the image. At step 1380, the system may generate the M decomposition images by processing the RGB-D input using the trained machine-learning model. Then at step 1390, the system may display the M decomposition image via a multifocal display. When the M decomposition images superimpose on the user's retinal, the user would see the appropriate defocus-blur effect according to the focal distance or accommodation of the user's eyes.

Experiments have shown that the multilayer decomposition generated using embodiments described herein outperform existing methods. With respect to the accuracy of the defocus blur perceived by viewers, the superimposed view of the multilayer decompositions generated using each method is compared with a benchmark simulated retinal image. The results from using the embodiments described herein produce fewer errors, as evaluated using PSNR, than prior optimized blending and linear blending methods. In one experiment, quantitative comparisons were made at varying focal distances. The experiment compared the average PSNRs of result images generated by each method for multifocal decomposition, over 15 scenes at each focal distance ranging between 0.1 and 2.2 diopters. It has been observed that the results generated using the embodiments described herein produce more accurate results (evidenced by higher PSNR measurements) compared to results from existing methods. The disparity between the relative performances is even more drastic under runtime-limited conditions. For example, in one experiment, a runtime constraint is applied so that every method has the same amount of time to generate the multilayer decomposition images. The runtime constraint is a practical constraint, since many applications, such as games and VR applications, require real-time dynamic rendering. Again, the experiment measures the average PSNRs of result images over 15 scenes at each focal distance ranging between 0.1 and 2.2 diopters. It has been observed that the PSNRs of embodiments described herein fall roughly between the 39-49 PSNR range, which is significantly better than that of existing methods (e.g., the best of which ranging between 33-36 PSNR, with the rest ranging between 27-31 PSNR).

Figure 14A:
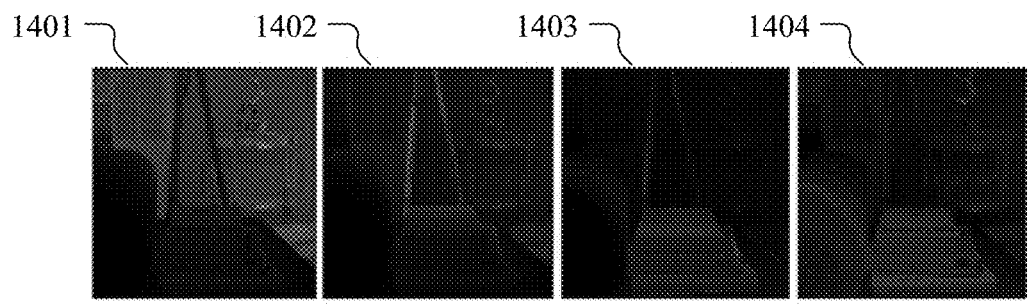
FIGS. 14A-D illustrate example multilayer decomposition results from particular embodiments compared to prior methods.

FIGS. 14A-D show example results from of an embodiment of the network generating real-time multilayer decompositions directly from RGB-D. FIG. 14A illustrates four multilayer decomposition images 1401, 1402, 1403, 1404 generated using embodiments described herein.

Figure 14B:
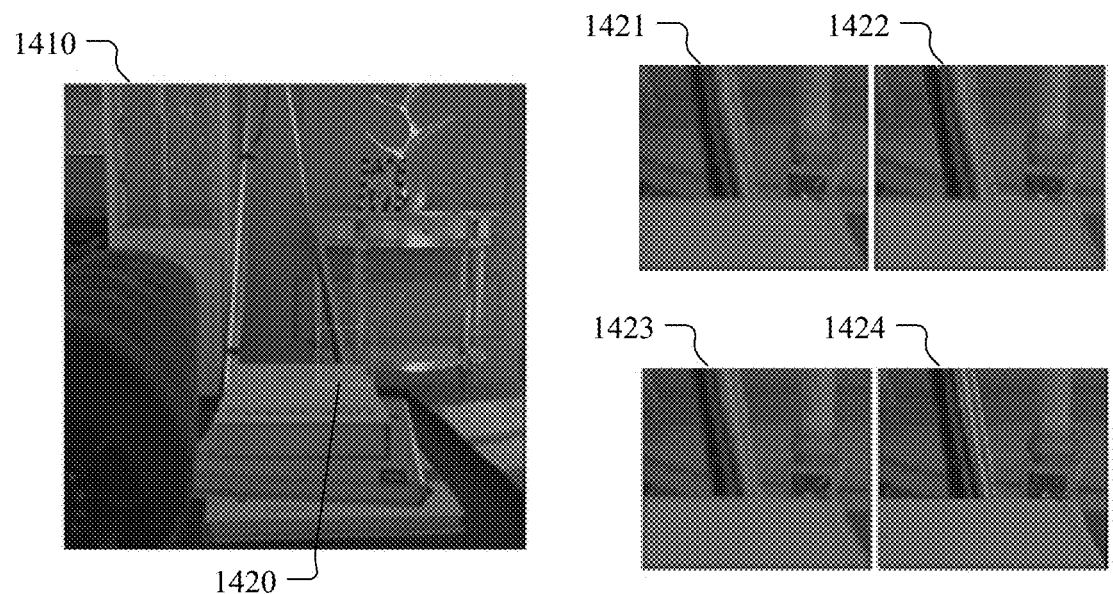

FIG. 14B illustrates comparisons of far-focus (e.g., 0.1 D) results. The image 1410 is the retinal image (generated using the images 1401-1404) that a user would see when focusing at 0.1 D. A portion 1420 of the image 1410 is zoomed-in and shown as image 1421. For comparison purposes, FIG. 14B also illustrates the corresponding portion generated using an existing method 1422, a reference image 1423 (which can be considered as the "ground truth"), and an RGB image 1424 of the same portion that has no defocus-blurring effect. A visual comparison of the images should confirm that the image 1421 generated using embodiments described herein, compared to the image 1422 generated using existing methods, is noticeably more similar to the reference image 1423. Quantitatively, at far focus (0.1 D), image 1410 generated using embodiments described herein (PSNR=42.40 dB) outperforms the image (not shown, but corresponds to the zoomed-in portion 1422) generated using the existing method (PSNR=38.75 dB). FIG. 14D further illustrates a comparison using SSIM. The image 1451 on the left is the SSIM map of the image 1410 generated using embodiments described herein, and the image 1452 on the right is the SSIM map of the image generated using the existing method. The SSIM image 1451 on the left has noticeably less deviations (with an average SSIM=0.9924) than that of the SSIM image 1452 on the right (with an average SSIM=0.9824).

Figure 14C:
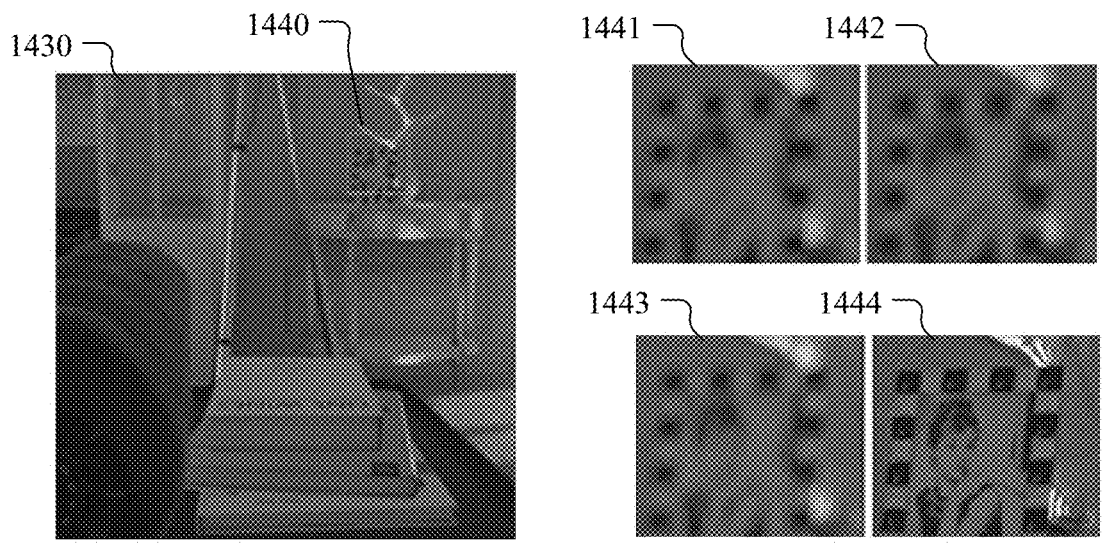
Figure 14D:
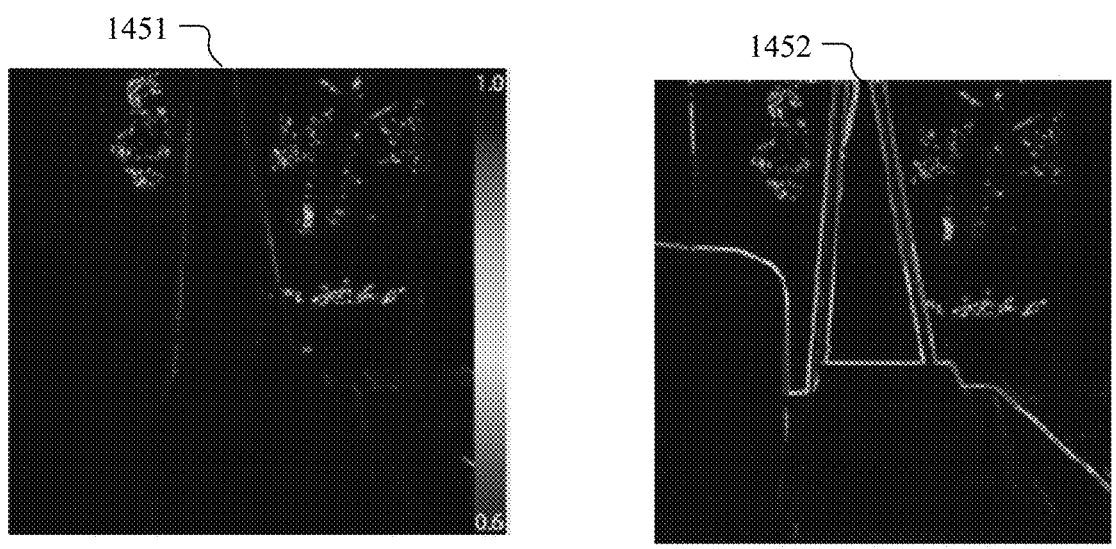

FIG. 14C illustrates comparisons of near-focus (e.g., 2.2 D) results. The image 1430 is the retinal image (generated using the images 1401-1404) that a user would see when focusing at 2.2 D. A portion 1440 of the image 1430 is zoomed-in and shown as image 1441. For comparison purposes, FIG. 14C also illustrates the corresponding portion generated using an existing method 1442, a reference image 1443 (which can be considered as the "ground truth"), and an RGB image 1444 of the same portion that has no defocus-blurring effect. A visual comparison of the images should confirm that the image 1441 generated using embodiments described herein, compared to the image 1442 generated using existing methods, is noticeably more similar to the reference image 1443. Quantitatively, at near focus (2.2 D), image 1430 generated using embodiments described herein (PSNR=44.05 dB, SSIM=0.9954) outperforms the image (not shown, but corresponds to the zoomed-in portion 1442) generated using the existing method (PSNR=37.55 dB, SSIM=0.9860).

Rendering Multiview Elemental Images for Light Field Display

Figure 15:
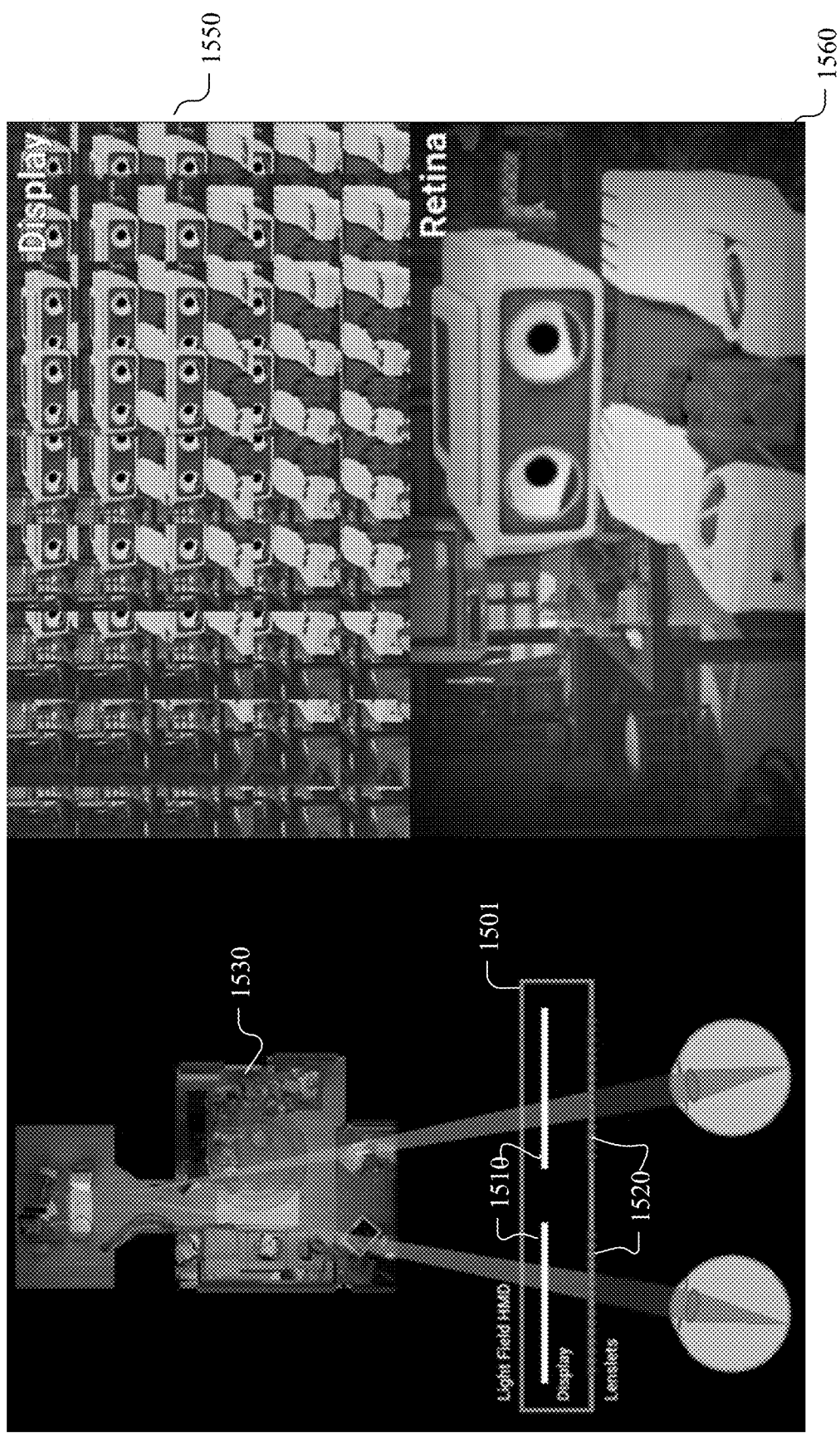
FIG. 15 illustrates an example of a light field HMD, an array of elemental images displayed thereon, and an image as seen by a user based on his/her focus.

Particular embodiments described herein use machine learning to generate multiview elemental images for light field displays. FIG. 15 illustrates an example of a light field HMD 1501 that has a physical display 1510. In contrast to varifocal displays, light field HMDs 1501 are designed to eliminate the need for eye tracking. To address vergence-accommodation conflicts and to provide defocus blur, light field HMDs 1501 contain an array of miniaturized projectors, often constructed by placing a microlens (or lenslets) array 1520 over a display 1510. As a user accommodates, the image created by each projector shifts on the retina, with the resulting superposition approximating natural defocus blur of the virtual scene 1530 without eye tracking. Light field HMDs 1501 may be used in virtual and augmented reality configurations.

As shown in FIG. 15, light field HMDs 1501 require dense multiview imagery 1550 (each of which is referred to as an elemental image) that is shown on the display 1510 of the light field HMD 1501. The elemental images of the multiview imagery 1550 depict the scene from different viewpoints. The multiview imagery 1550, when seen through the microlens array 1520, results in a view 1560 of the virtual scene 1530 with the appropriate defocus blur.

Conventionally, the dense array of images in the multiview imagery 1550 are generated directly by ray tracing and/or rasterization, where each elemental image is rendered from a distinct viewpoint (arranged in a grid). Rendering tens or even hundreds of views interactively is computationally expensive and thus unsuitable for real-time applications. Even if such methods are used in real-time applications, the lengthy computation time limits the application to simplified scenes. Foveated light field rendering may reduce the computational overhead, but this approach continues to rely on ray tracing, limiting performance. Furthermore, foveated light field rendering reintroduces the requirement for eye tracking, since foveated view depends on eye gaze. Multiview image synthesis is also required for direct-view auto-multiscopic displays. To address the need for generating dense multi-view imagery 1550 in real-time or near real-time, particular embodiments described herein use image synthesis networks for generating dense view synthesis from sparse RGB-D images for HMD applications. Particular embodiments significantly reduce the number of rendered views (e.g., 5, 9, etc., compared to the potentially hundreds of views), synthesizing the rest. As described herein, embodiments of the network may synthesize novel views from a sparse set of RGB-D images efficiently.

Figure 16A:
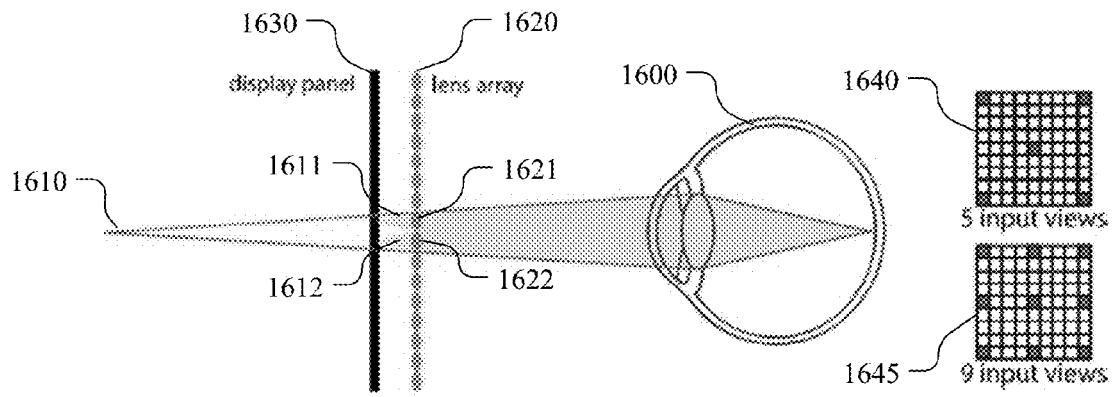
FIGS. 16A-C illustrate example inputs and outputs of particular embodiments for generating multiview elemental images for light field displays.
Figure 16B:
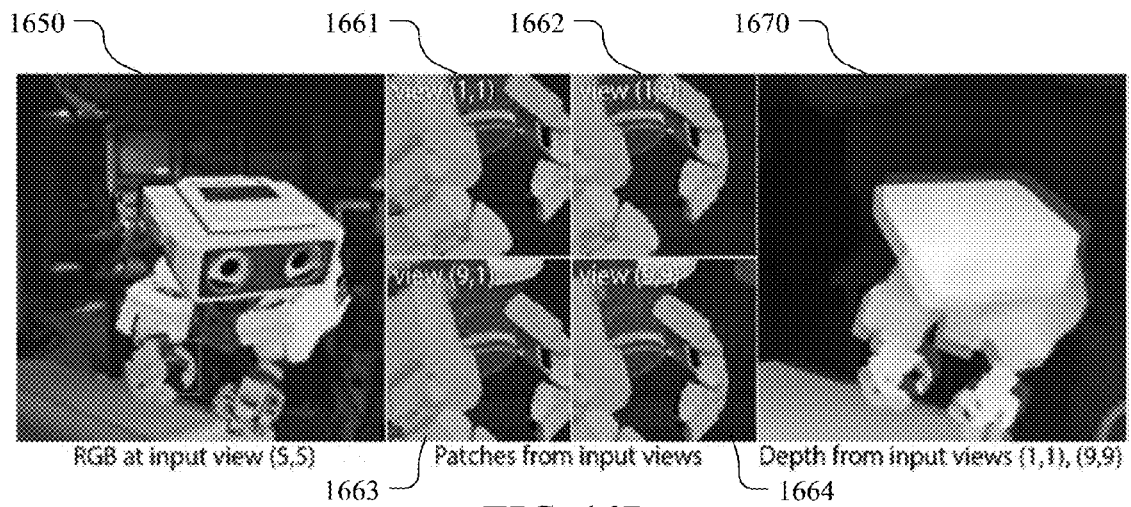
Figure 16C:
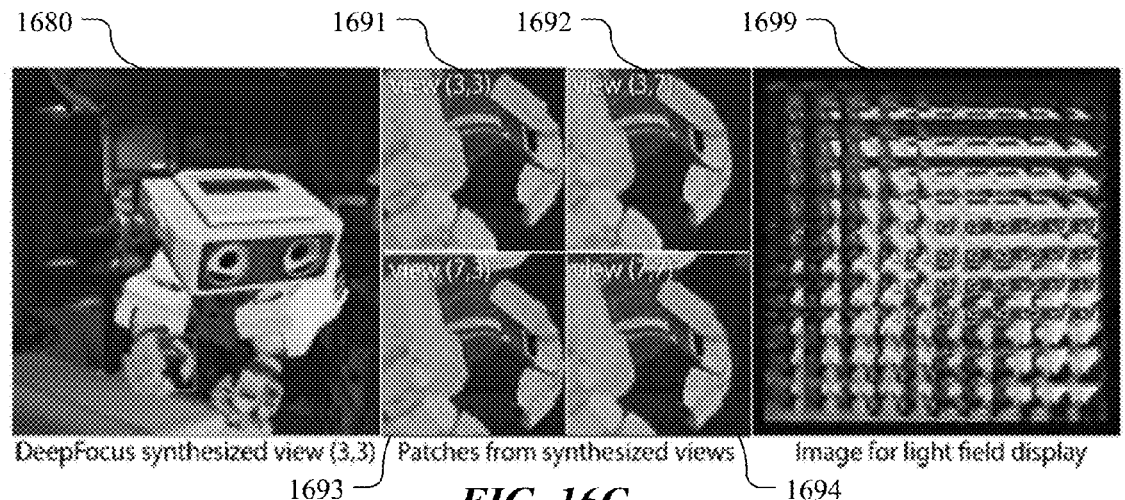

FIGS. 16A-C illustrate example inputs and outputs of particular embodiments for generating multiview elemental images for light field displays. FIG. 16A shows an example of a near-eye light field display with a microlens array 1620 (e.g., with a 35-degree field of view or any other suitable range) positioned between a viewer's eye 1600 and a display panel 1630. Depending on where the eye 1600 is looking 1610, particular microlenses (e.g., 1621 and 1622 shown in FIG. 16A) would be within the eye's 1600 field of view. Those microlenses, in turn, would focus the user on particular regions of the display 1630 that may correspond to particular elemental images. For example, microlens 1621 may focus 1611 on one elemental image, and microlens 1622 may focus 1612 on another elemental image. The image perceived by a viewer adapts with the viewer's focal distance by superposing multiple images from the microlens array to approximate the desired blur.

As previously discussed, the large number of elemental images to be displayed by a light field HMD may be generated from a small discrete set of input images captured from different viewpoints. In one example where five input images are used, the input view positions may be represented by the black squares shown in the pattern 1640 (i.e., four corner viewpoints and one center viewpoint). In another example where nine input images are used, the input view positions may be represented by the black squares shown in the pattern 1645 (i.e., four corner viewpoints, one center viewpoint, and four additional viewpoints at the center of each side). Other viewpoint patterns may also be used, so long as they provide sufficient samples of the range of viewpoints of interest.

FIG. 16B shows an example of the input RGB-D images that may be used to generate elemental images for a light field display. In an embodiment where five input images are used, the five corresponding viewpoints may be denoted by the coordinates (5, 5) for the center, (1, 1) for the upper-left corner, (1, 9) for the upper-right corner, (9, 1) for the lower-left corner, and (9, 9) for the lower-right corner. The RGB image 1650 shown corresponds to the center (5, 5) viewpoint, and the image 1670 corresponds to the depth maps from viewpoints (1, 1) and (9, 9). Images 1661, 1662, 1663, 1664 are the same, zoomed-in portion of the corner RGB images that correspond to the (1, 1), (1, 9), (9, 1), and (9, 9) viewpoints. As more clearly shown by the zoomed-in images 1661, 1662, 1663, 1664, different viewpoints provide different information about the scene.

Particular embodiments use machine learning to leverage the information provided by the sample viewpoints to synthesize elemental images from between those viewpoints. FIG. 16C depicts the synthesized views 1680, 1691, 1692, 1693, 1694 and the final image 1699 shown on display panel. The synthesized image 1680 is from the (3, 3) viewpoint, and a particular portion of that image 1680 is shown as image 1691. Images 1692, 1693, 1694 are zoomed-in portions of other synthesized images from, respectively, the (3, 7), (7, 3), and (7, 7) viewpoints. The entire multiview elemental images is shown as image 1699.

Figure 17:
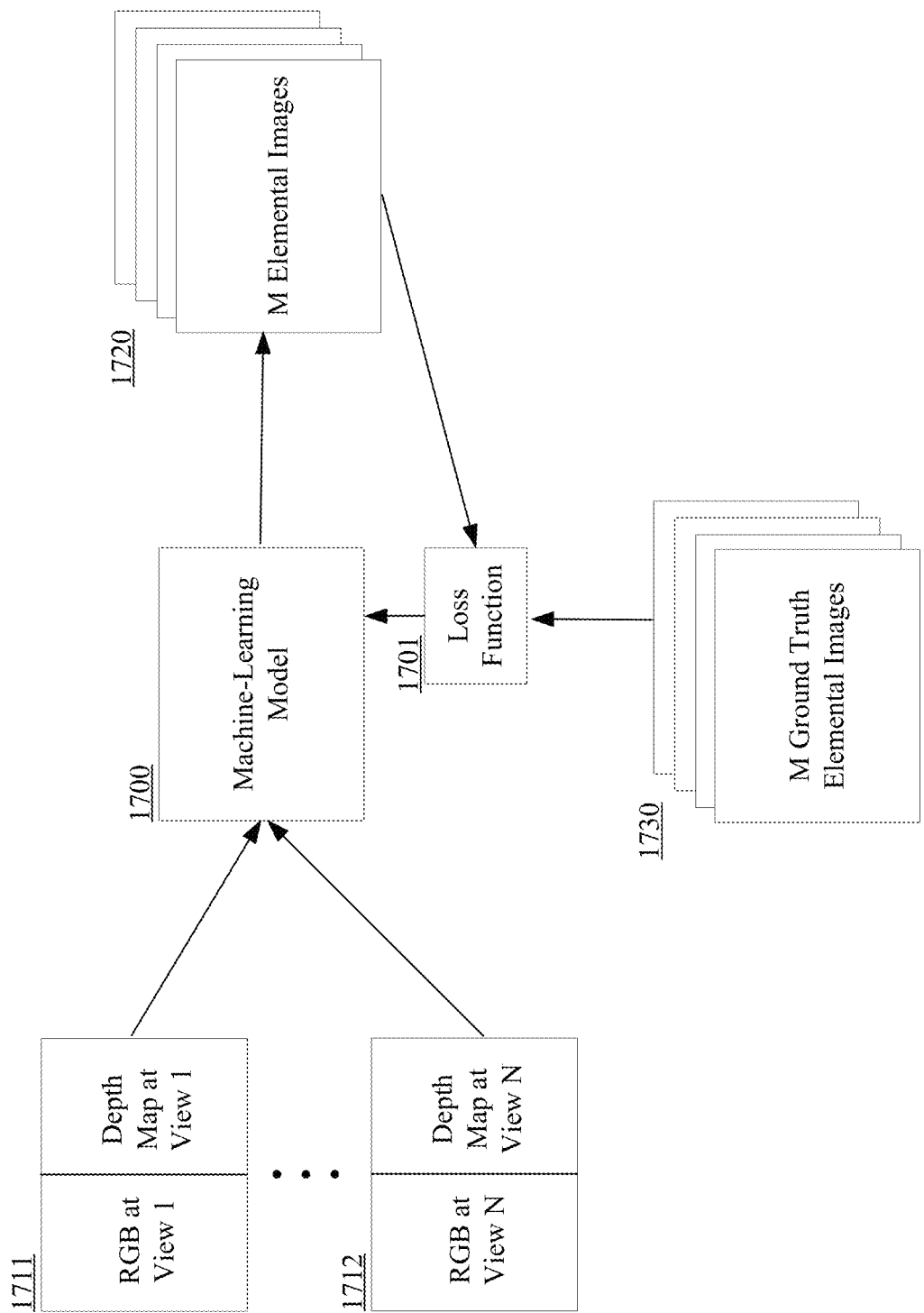
FIG. 17 illustrates a block diagram of a machine-learning model configured to generate multiview elemental images for a light field display.

FIG. 17 illustrates a block diagram of a machine-learning model 1700 configured to generate multiview elemental images for a light field display. In particular embodiments, the machine-learning model 1700 may use the network architecture shown in FIGS. 2A-2C. In particular embodiments, the model 1700 may use a constant number of filters (e.g., 64, 128, or 256, etc.) in each network layer, regardless of the size of the network (e.g., including a seven-layer, nine-layer, eleven-layer network, etc.). In particular embodiments, the machine-learning model 1700 may process each color channel separately, regardless of the size of the network (e.g., including a seven-layer, nine-layer, eleven-layer network, etc.). Particular embodiments of the machine-learning model 1700 may take as input N RGB-D image (which may all be all-in-focus). The input RGB-D images may be rendered at a sparse set of views (e.g., from 5, 7, 9, 13, etc. viewpoints). FIG. 17 illustrates a representative RGB-D input 1711 corresponding to a first viewpoint and another representative RGB-D input 1712 corresponding to the N-th viewpoint. Based on these inputs, the machine-learning model 1700 may be configured to generate M elemental images 1720 as output (e.g., the output layer of the network shown in FIGS. 2B-C may produce the M elemental images directly). For example, given 5 RGB-D inputs, the model may be trained to generate multiview elemental images, such as the multiview elemental images 1699 shown in FIG. 16C. Thus, more formally, the machine-learning model 1700, in particular embodiments, performs the following operation:

$$\{y_1, y_2, \ldots, y_M\} = CNN(x_1, d_1, x_2, d_2, \ldots, x_N, d_N)$$

where $x_i$ and $d_i$ (for i=1, 2, ... N) represent the image and depth map, respectively, associated with an input viewpoint i; and $y_j$ (for j=1, 2, ... M) represents an output elemental image associated with a new viewpoint j.

During each training iteration, the generated images 1720 may be compared with a set of M ground-truth images 1730. Each image in the ground-truth images 1730 may correspond to a desired viewpoint. In particular embodiments, the comparison may be performed using a loss function 1701. An optimization of that loss function 1701 may then be the basis for updating the parameters of the machine-learning model 1700 to improve its results. In particular embodiments, the training loss may be a weighted sum of the peak signal-to-noise ratio (PSNR), as defined above. More formally, the training loss, in particular embodiments, may be defined as:

$$\sum_{j=1}^{M} (PSNR(y_j) + 0.5(PSNR(\nabla_1 y_j) + PSNR(\nabla_2 y_j)))$$

Particular embodiments may penalize the PSNR of the elemental images compared to the ground-truth rendering of the scene from corresponding viewpoints. Other embodiments may penalize the PSNR of the final image perceived by the user.

Figure 18A:
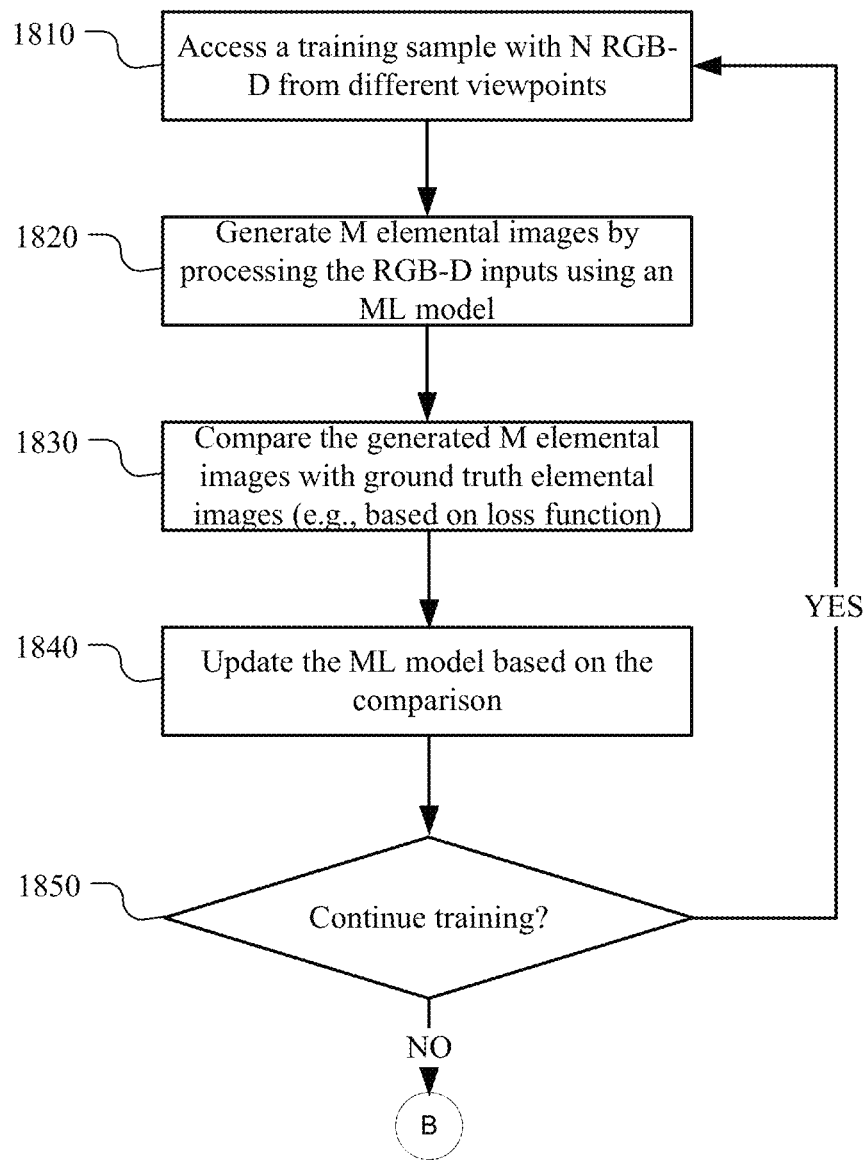
FIG. 18A illustrates an example method for training a machine-learning model to generate elemental images of a scene of interest based on a sparse set of RGB-D inputs of the scene of interest from different viewpoints.

FIG. 18A illustrates an example method 1800 for training a machine-learning model to generate elemental images of a scene of interest based on a sparse set of RGB-D inputs of the scene of interest from different viewpoints. The method may begin at step 1810, where a computing system used for training the model may access, from a training dataset, a training sample that includes training images and corresponding training depth maps of a scene (e.g., the N RGB-D inputs 1711, 1712 shown in FIG. 17). The training images may be associated with different predetermined viewpoints of the scene. In particular embodiments, the predetermined viewpoints associated with the training images may be within a predetermined range of viewpoints of interest. For example, the predetermined range of viewpoints of interest may be associated with an area (e.g., a polygonal area, such as a square, rectangle, triangle, etc.) from which a user may view a scene. The area may be segmented into discrete viewpoints. For example, as shown in FIG. 16A, the predetermined range of viewpoints of interest may be segmented into 9×9 grids (e.g., referenced by labels 1640 and 1645). In particular embodiments, the predetermined viewpoints associated with the training images may include one or more boundary viewpoints of the predetermined range of viewpoints. For example, the grid diagram 1640 shown in FIG. 16A includes four corners of the rectangular grid, and the grid diagram 1645 further includes mid-points of the four edges of the rectangular grid. In particular embodiments, the predetermined viewpoints associated with the training images may include a center viewpoint in the predetermined range of viewpoints of interest (e.g., the center point in the grid diagrams 1640 and 1645). In particular embodiments, each object in the scene may be in-focus in the training images and the corresponding depth maps.

At step 1820, the system may generate M elemental images of the scene by processing the training images and the training depth maps using a machine-learning model (e.g., such as those shown in FIGS. 2A-C). For example, during a current training iteration, a convolutional neural network may process the N RGB-D inputs based on its current states or parameters to generate the M elemental images. At the end of the current training iteration, the model may be updated, as described in further detail below. During the next training iteration, the updated model would be used to generate another set of M elemental images based on the next training sample, and so on.

In particular embodiments, the generated M elemental images may be associated with more viewpoints of the scene than the predetermined viewpoints associated with the training images. For example, if the machine-learning model is trained to take as input N=5 RGB-D images that are associated with 5 different viewpoints within a range of interest, the model may output M=25, 81, 100, or any other number of elemental images that more densely cover viewpoints within the range of interest. For example, as shown in FIG. 16C, even though the RGB-D inputs only covers viewpoints (1, 1,), (1, 9), (9, 1), (9, 9), and (5, 5), the synthesized elemental images cover viewpoints such as (3, 3), (3, 7), (7, 3), and (7, 7), which are between the predetermined viewpoints covered by the RGB-D inputs.

At step 1830, the system may compare the generated M elemental images of the scene and target elemental images (the "ground truth") associated with the training sample. In particular embodiments, the comparison may be based on a loss function, as described elsewhere herein. In particular embodiments, to assess the generated M elemental images, the training sample may be associated with M corresponding target elemental images. The target elemental images may each be associated with a predetermined viewpoint. For example, if there are M=81 target elemental images covering a 9×9 grid of viewpoints, the images may be associated with every viewpoint within the coordinates ([1-9], [1-9]). In particular embodiments, the comparison may include M 1-to-1 comparisons between each of the generated elemental images of the scene and an associated one of the target elemental images. For example, a generated elemental image associated with viewpoint (4, 8) may be compared with a target elemental image associated with the same (4, 8) viewpoint. Similarly, each of the other generated elemental images may be compared with the target elemental image that share a common viewpoint with that generated elemental image.

In particular embodiments, the generated M elemental images may be output by the machine-learning model as separate images. In particular embodiments, the M separate elemental images may be compared to M separate target elemental images. In particular embodiments, the M separate elemental images may be used as components to form a single image, such as the array of elemental images 1550 shown in FIG. 15. In other embodiments, the machine-learning model may directly output such a single image that includes the M elemental images as components. This single image may be compared to a target single image that includes components of M target elemental images. The M target elemental images may be arranged in a grid format based on their respective associated viewpoints. For example, the target elemental image located at the (1, 1) position in the grid may be associated with the top-left corner viewpoint of interest, the target elemental image located at the (2, 1) position in the grid may be associated with a viewpoint that is slightly lower than the top-left corner viewpoint, the target elemental image located at the (1, 2) position in the grid may be associated with a viewpoint that is slightly to the right of the top-left corner viewpoint, and so on. Once the model has been trained, it may output M generated elemental images that are similarly arranged and associated with the same viewpoints that are associated with the corresponding target elemental images.

At step 1840, the system may, based on the comparison between the generated elemental images and the target elemental images, update the machine-learning model. In particular embodiments, the updates are made in an effort to optimize the loss function or to minimize the differences between the generated elemental images and their respective associated target elemental images.

At step 1850, the system may determine whether to continue training, which may be based on predetermined termination rules. In particular embodiments, training may terminate once a predetermined number (e.g., 1000, 10,000, etc.) of training samples have been used to train the model. In particular embodiments, training may terminate once the training samples in the training dataset have all been used to train the model. In particular embodiments, training may terminate when the loss comparison is sufficiently small or below a predetermined threshold. If the system determines that training should continue, the process may repeat from step 1810. If instead, the system determines that training should terminate, training would terminate. The trained model is configured to generate elemental images of a scene of interest based on input images and corresponding depth maps of the scene of interest from different viewpoints. In particular embodiments, the trained machine-learning model is configured to generate elemental images for light field displays.

Figure 18B:
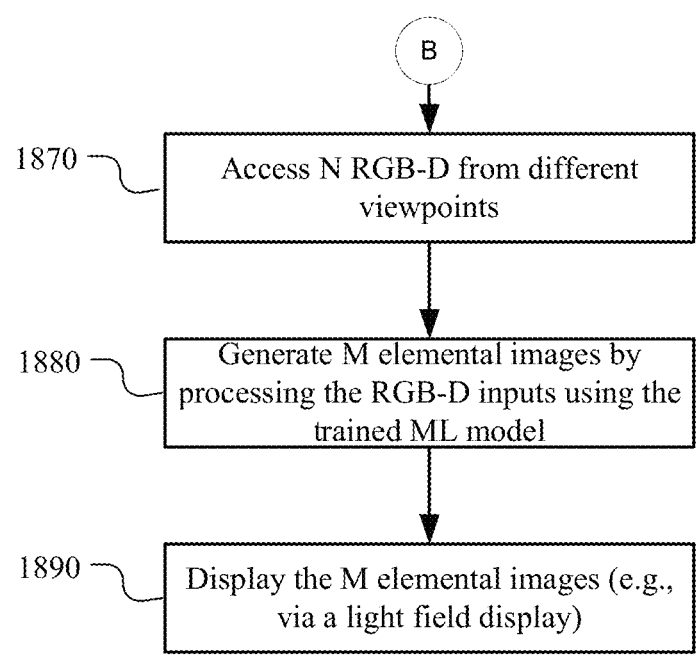
FIG. 18B illustrates an example method for using a trained machine-learning model to generate elemental images at inference time.

FIG. 18B illustrates an example method 1801 for using a trained machine-learning model to generate M elemental images at inference time. The trained machine-learning model may be provided to or downloaded by any computing system (e.g., an end user's device, such as a smartphone, virtual reality system, gaming system, etc.). The method may begin at step 1870, where the computing system may access N RGB-D inputs from different viewpoints. The viewpoints of the N RGB-D inputs may be the same as those of the N training RGB-D inputs used during training. The N RGB-D inputs (each of which may be a video frame) may be provided by, for example, a gaming engine or any other application that wishes to add realistic defocus-blurring effect to a scene. At step 1880, the system may generate the M elemental images by processing the RGB-D inputs using the trained machine-learning model. Then at step 1890, the system may display the M elemental image via a light field display. When the M elemental images are seen through the microlens array and selectively superimposed on the user's retinal, the user would see the appropriate defocus-blur effect according to the focal distance or accommodation of the user's eyes.

Figure 19A:
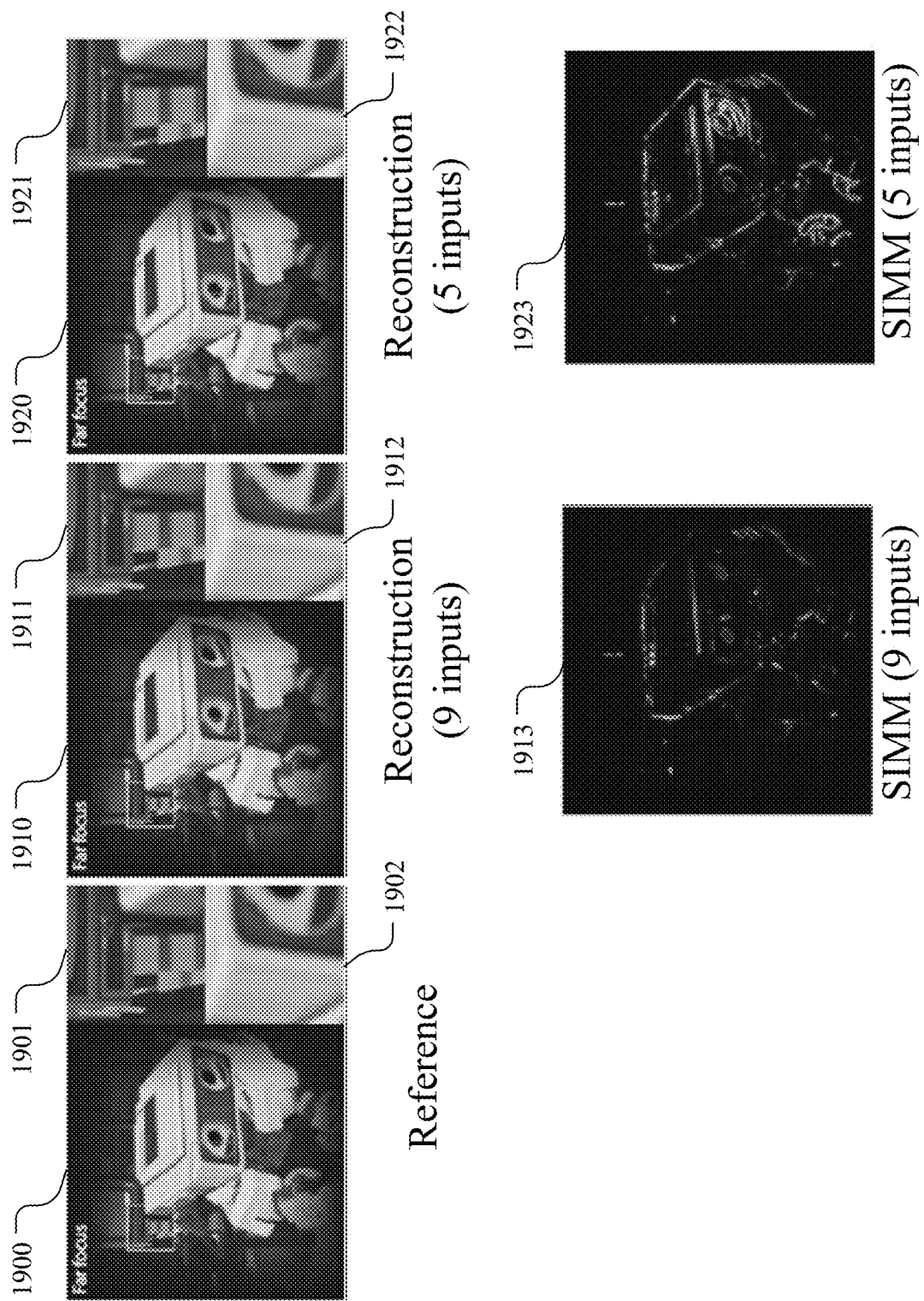
FIGS. 19A-19B illustrates examples of simulated retinal images as seen through a light field HMD, including visual artifacts assessed using SSIM.
Figure 19B:
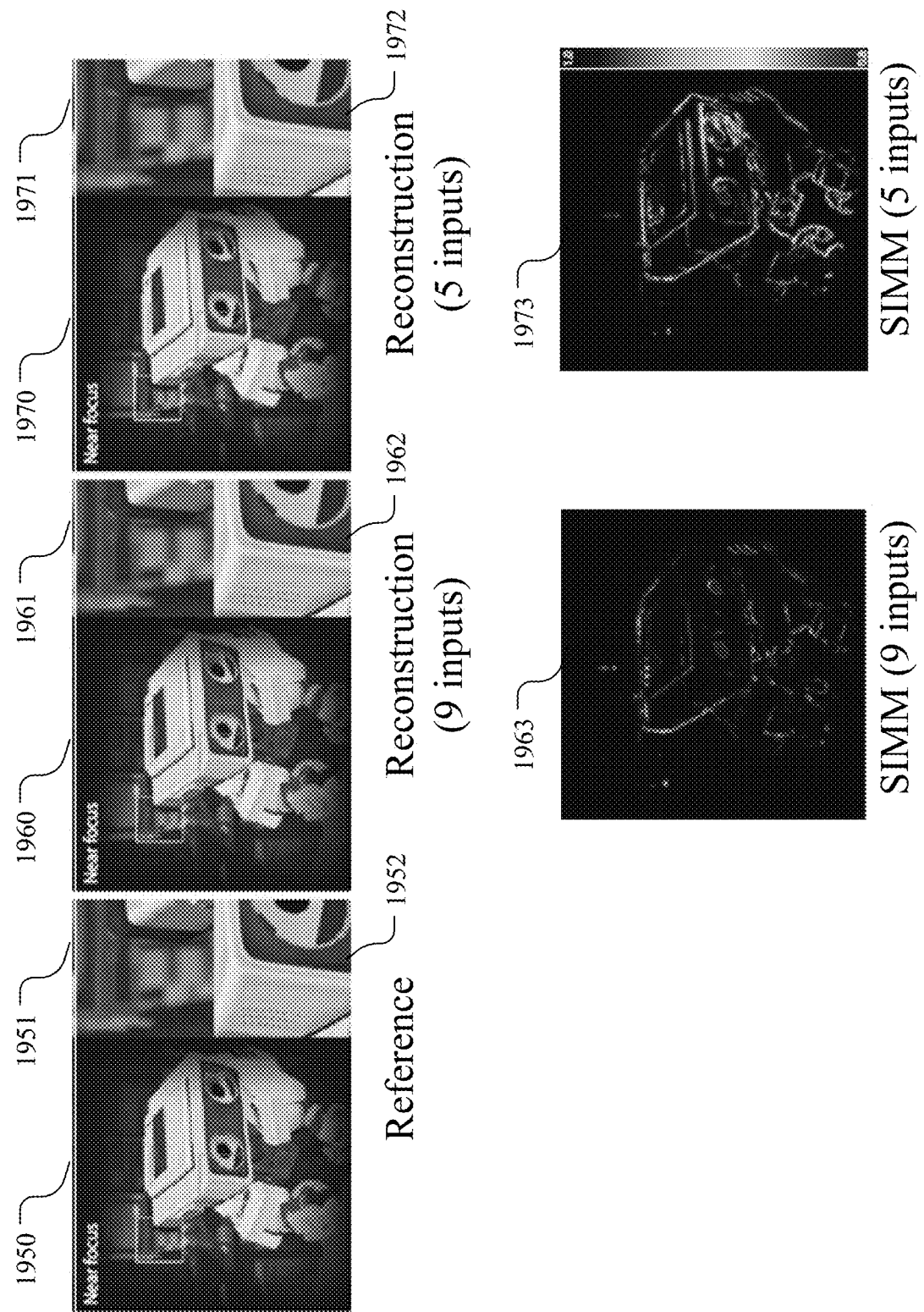

Experiments have shown that the elemental images generated using embodiments described herein outperform existing methods. FIGS. 19A-19B illustrate examples of simulated retinal images, including visual artifacts assessed using SSIM. In particular, the figure shows simulated retinal images created with a near-eye light field display using embodiments described herein. FIG. 19A illustrates far-focus examples and FIG. 19B illustrates near-focus examples. Referring to FIG. 19A, a far-focused (e.g., 0.5 D) reference image 1900 and zoomed-in portions 1901 and 1902 thereof are provided. The simulated image 1910 shows what a user would perceive when focusing afar, along with zoomed-in portions 1911 and 1912 thereof. The image 1910 is based on elemental images that were generated using 9 RGB-D inputs. The simulated image 1920 also shows what a user would perceive when focusing afar, along with zoomed-in portions 1921 and 1922 thereof, but here the simulated image 1920 is based on elemental images that were generated using 5 RGB-D inputs. Visually, the reconstructed images 1910 and 1920 (and their respective zoomed-in portions 1911, 1912, 1921, 1922) are both very similar to the reference image 1900 (and its zoomed-in portion 1901, 1902). Quantitatively, both reconstructed images 1910 and 1920 produce very few artifacts—the image 1910 measures PSNR=44.64 dB and SSIM=0.9951, and the image 1920 measures PSNR=41.05 dB, SSIM=0.9906. Images that visualize the pixel-wise SSIM errors are also shown. The SSIM image 1913 reflects the SSIM of the image 1910 (i.e., constructed using 9 RGB-D inputs), and the SSIM image 1923 reflects the SSIM of the image 1920 (i.e., constructed using 5 RGB-D inputs). As shown by the SSIM images 1913 and 1923, both simulated images 1910 and 1920 produce few visual artifacts.

Referring to FIG. 19B, a near-focused (e.g., 2.2 D) reference image 1950 and zoomed-in portions 1951 and 1952 thereof are provided. The simulated image 1960 shows what a user would perceive when focusing near, along with zoomed-in portions 1961 and 1962 thereof. The image 1960 is based on elemental images that were generated using 9 RGB-D inputs. The simulated image 1970 also shows what a user would perceive when focusing near, along with zoomed-in portions 1971 and 1972 thereof, but here the simulated image 1970 is based on elemental images that were generated using 5 RGB-D inputs. Visually, the reconstructed images 1960 and 1970 (and their respective zoomed-in portions 1961, 1962, 1971, 1972) are both very similar to the reference image 1950 (and its zoomed-in portion 1951, 1952). Quantitatively, both reconstructed images 1960 and 1970 produce very few artifacts—the image 1960 measures PSNR=42.71 dB, SSIM=0.9940, and the image 1970 measures PSNR=38.33 dB, SSIM=0.9889. Images that visualize the pixel-wise SSIM errors are also shown. The SSIM image 1963 reflects the SSIM of the image 1960 (i.e., constructed using 9 RGB-D inputs), and the SSIM image 1973 reflects the SSIM of the image 1970 (i.e., constructed using 5 RGB-D inputs). As shown by the SSIM images 1963 and 1973, both simulated images 1960 and 1970 produce few visual artifacts.

Figure 20:
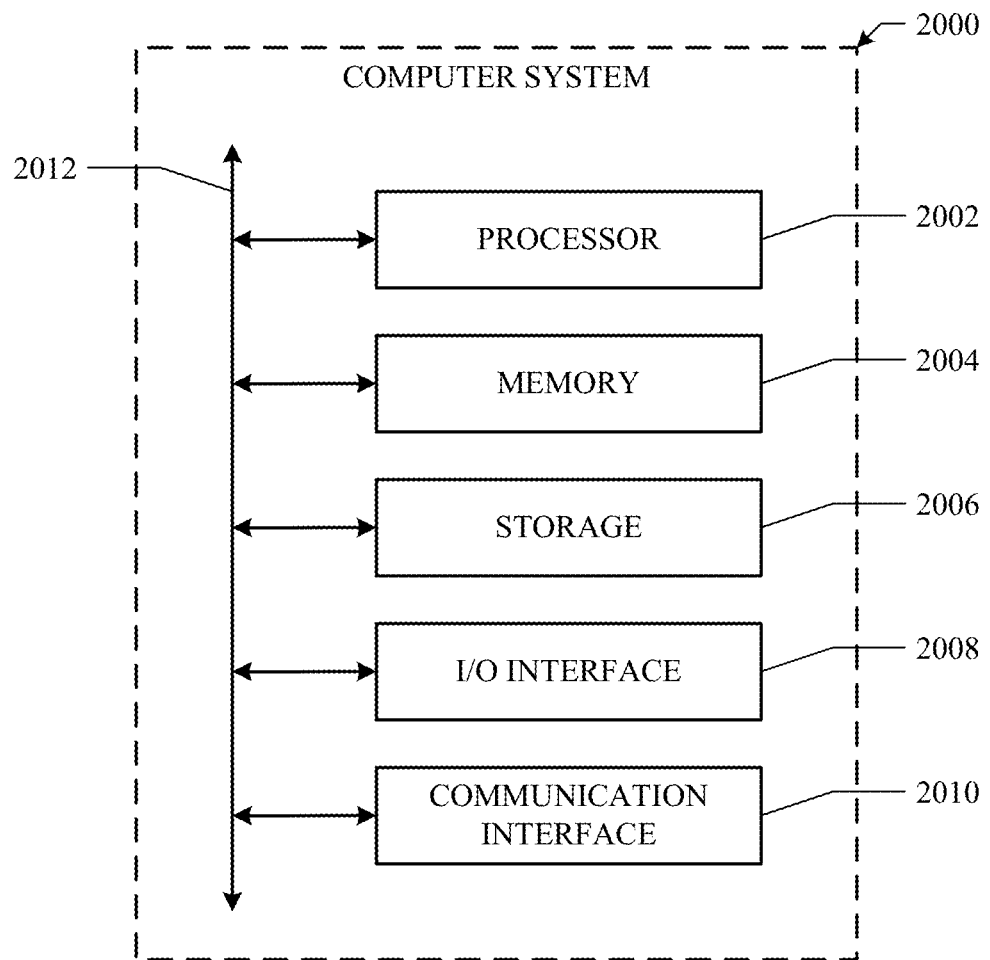
FIG. 20 illustrates an example computer system.

FIG. 20 illustrates an example computer system 2000. In particular embodiments, one or more computer systems 2000 perform one or more steps of one or more methods described or illustrated herein. In particular embodiments, one or more computer systems 2000 provide functionality described or illustrated herein. In particular embodiments, software running on one or more computer systems 2000 performs one or more steps of one or more methods described or illustrated herein or provides functionality described or illustrated herein. Particular embodiments include one or more portions of one or more computer systems 2000. Herein, reference to a computer system may encompass a computing device, and vice versa, where appropriate. Moreover, reference to a computer system may encompass one or more computer systems, where appropriate.

This disclosure contemplates any suitable number of computer systems 2000. This disclosure contemplates computer system 2000 taking any suitable physical form. As example and not by way of limitation, computer system 2000 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 2000 may include one or more computer systems 2000; be unitary or distributed; span multiple locations; span multiple machines; span multiple data centers; or reside in a cloud, which may include one or more cloud components in one or more networks. Where appropriate, one or more computer systems 2000 may perform without substantial spatial or temporal limitation one or more steps of one or more methods described or illustrated herein. As an example and not by way of limitation, one or more computer systems 2000 may perform in real time or in batch mode one or more steps of one or more methods described or illustrated herein. One or more computer systems 2000 may perform at different times or at different locations one or more steps of one or more methods described or illustrated herein, where appropriate.

In particular embodiments, computer system 2000 includes a processor 2002, memory 2004, storage 2006, an input/output (I/O) interface 2008, a communication interface 2010, and a bus 2012. Although this disclosure describes and illustrates a particular computer system having a particular number of particular components in a particular arrangement, this disclosure contemplates any suitable computer system having any suitable number of any suitable components in any suitable arrangement.

In particular embodiments, processor 2002 includes hardware for executing instructions, such as those making up a computer program. As an example and not by way of limitation, to execute instructions, processor 2002 may retrieve (or fetch) the instructions from an internal register, an internal cache, memory 2004, or storage 2006; decode and execute them; and then write one or more results to an internal register, an internal cache, memory 2004, or storage 2006. In particular embodiments, processor 2002 may include one or more internal caches for data, instructions, or addresses. This disclosure contemplates processor 2002 including any suitable number of any suitable internal caches, where appropriate. As an example and not by way of limitation, processor 2002 may include one or more instruction caches, one or more data caches, and one or more translation lookaside buffers (TLBs). Instructions in the instruction caches may be copies of instructions in memory 2004 or storage 2006, and the instruction caches may speed up retrieval of those instructions by processor 2002. Data in the data caches may be copies of data in memory 2004 or storage 2006 for instructions executing at processor 2002 to operate on; the results of previous instructions executed at processor 2002 for access by subsequent instructions executing at processor 2002 or for writing to memory 2004 or storage 2006; or other suitable data. The data caches may speed up read or write operations by processor 2002. The TLBs may speed up virtual-address translation for processor 2002. In particular embodiments, processor 2002 may include one or more internal registers for data, instructions, or addresses. This disclosure contemplates processor 2002 including any suitable number of any suitable internal registers, where appropriate. Where appropriate, processor 2002 may include one or more arithmetic logic units (ALUs); be a multi-core processor; or include one or more processors 2002. Although this disclosure describes and illustrates a particular processor, this disclosure contemplates any suitable processor.

In particular embodiments, memory 2004 includes main memory for storing instructions for processor 2002 to execute or data for processor 2002 to operate on. As an example and not by way of limitation, computer system 2000 may load instructions from storage 2006 or another source (such as, for example, another computer system 2000) to memory 2004. Processor 2002 may then load the instructions from memory 2004 to an internal register or internal cache. To execute the instructions, processor 2002 may retrieve the instructions from the internal register or internal cache and decode them. During or after execution of the instructions, processor 2002 may write one or more results (which may be intermediate or final results) to the internal register or internal cache. Processor 2002 may then write one or more of those results to memory 2004. In particular embodiments, processor 2002 executes only instructions in one or more internal registers or internal caches or in memory 2004 (as opposed to storage 2006 or elsewhere) and operates only on data in one or more internal registers or internal caches or in memory 2004 (as opposed to storage 2006 or elsewhere). One or more memory buses (which may each include an address bus and a data bus) may couple processor 2002 to memory 2004. Bus 2012 may include one or more memory buses, as described below. In particular embodiments, one or more memory management units (MMUs) reside between processor 2002 and memory 2004 and facilitate accesses to memory 2004 requested by processor 2002. In particular embodiments, memory 2004 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 2004 may include one or more memories 2004, where appropriate. Although this disclosure describes and illustrates particular memory, this disclosure contemplates any suitable memory.

In particular embodiments, storage 2006 includes mass storage for data or instructions. As an example and not by way of limitation, storage 2006 may include a hard disk drive (HDD), a floppy disk drive, flash memory, an optical disc, a magneto-optical disc, magnetic tape, or a Universal Serial Bus (USB) drive or a combination of two or more of these. Storage 2006 may include removable or non-removable (or fixed) media, where appropriate. Storage 2006 may be internal or external to computer system 2000, where appropriate. In particular embodiments, storage 2006 is non-volatile, solid-state memory. In particular embodiments, storage 2006 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 2006 taking any suitable physical form. Storage 2006 may include one or more storage control units facilitating communication between processor 2002 and storage 2006, where appropriate. Where appropriate, storage 2006 may include one or more storages 2006. Although this disclosure describes and illustrates particular storage, this disclosure contemplates any suitable storage.

In particular embodiments, I/O interface 2008 includes hardware, software, or both, providing one or more interfaces for communication between computer system 2000 and one or more I/O devices. Computer system 2000 may include one or more of these I/O devices, where appropriate. One or more of these I/O devices may enable communication between a person and computer system 2000. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 2008 for them. Where appropriate, I/O interface 2008 may include one or more device or software drivers enabling processor 2002 to drive one or more of these I/O devices. I/O interface 2008 may include one or more I/O interfaces 2008, where appropriate. Although this disclosure describes and illustrates a particular I/O interface, this disclosure contemplates any suitable I/O interface.

In particular embodiments, communication interface 2010 includes hardware, software, or both providing one or more interfaces for communication (such as, for example, packet-based communication) between computer system 2000 and one or more other computer systems 2000 or one or more networks. As an example and not by way of limitation, communication interface 2010 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 2010 for it. As an example and not by way of limitation, computer system 2000 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 2000 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 2000 may include any suitable communication interface 2010 for any of these networks, where appropriate. Communication interface 2010 may include one or more communication interfaces 2010, where appropriate. Although this disclosure describes and illustrates a particular communication interface, this disclosure contemplates any suitable communication interface.

In particular embodiments, bus 2012 includes hardware, software, or both coupling components of computer system 2000 to each other. As an example and not by way of limitation, bus 2012 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 2012 may include one or more buses 2012, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method for training a machine-learning model to generate images with defocus-blur effect based on input images and corresponding depth maps, the method comprising, by a computing system:
    accessing a training sample from a training dataset for the machine-learning model, the training sample for the machine-learning model comprising an in-focus input image of a scene and a corresponding depth map of the scene;
    accessing a circle-of-confusion map for the scene depicted in the in-focus input image, wherein the circle-of-confusion map is generated based on the depth map and encodes a desired focal surface in the scene;
    generating, using the machine-learning model, an output image with synthesized defocus-blur effect by processing the in-focus input image, the corresponding depth map, and the corresponding circle-of-confusion map; and
    updating the machine-learning model based on a comparison between the generated output image and a target image associated with the training sample, wherein the target image depicts the scene with a desired defocus-blur effect;
    wherein the updated machine-learning model is configured to generate the images with defocus-blur effect based on the input images and the corresponding depth maps.

2. The method of claim 1, wherein the updated machine-learning model is configured to generate the images for varifocal near-eye displays.

3. The method of claim 1, wherein each object in the scene is in-focus in the in-focus input image and the corresponding depth map.

4. The method of claim 1, wherein the target image with the desired defocus-blur effect is generated by path tracing using a predetermined focal length.

5. The method of claim 1,
    wherein the depth map comprises a plurality of depth pixels;
    wherein the circle-of-confusion map comprises a plurality of circle-of-confusion pixels that correspond to the plurality of depth pixels, respectively; and
    wherein each of the circle-of-confusion pixels is computed based on (1) the corresponding depth pixel and (2) an aperture and a focal length of a virtual camera model.

6. The method of claim 1,
    wherein the machine-learning model comprises at least one residual block that comprises sequentially connected layers, the sequentially connected layers comprising a first layer and a last layer; and
    wherein the residual block is configured to add an input of the first layer to an output of the last layer.

7. The method of claim 1,
    wherein the machine-learning model comprises a plurality of layers that includes a last layer and a next-to-last layer;
    wherein the machine-learning model is configured to generate a concatenated result by concatenating an input of the machine-learning model with an output of the next-to-last layer; and
    wherein the last layer is configured to use the concatenated result as input.

8. The method of claim 1, wherein the updated machine-learning model is configured to generate the images for television monitors, cinema screens, computer monitors, mobile phones, or tablets.

9. The method of claim 1, wherein the circle-of-confusion map is generated based on a circular defocus pattern.

10. The method of claim 1, wherein the circle-of-confusion map is generated based on a defocus pattern that is different from circular.

11. The method of claim 1, wherein the in-focus input image comprises color information from at least a first color channel and a second color channel, wherein the circle-of-confusion map is associated with the first color channel, wherein the output image is generated by further processing, using the machine-learning model, a second circle-of-confusion map associated with the second color channel.

12. The method of claim 11, further comprising:
generating a first output using at least the color information from the first color channel and the circle-of-confusion map associated with the first color channel;
generating a second output using at least the color information from the second color channel and the second circle-of-confusion map associated with the second color channel; and
combining at least the first output and the second output to generate the output image.

13. One or more computer-readable non-transitory storage media embodying software for training a machine-learning model to generate images with defocus-blur effect based on input images and corresponding depth maps, wherein the software that is operable when executed to:
access a training sample from a training dataset for the machine-learning model, the training sample for the machine-learning model comprising an in-focus input image of a scene and a corresponding depth map of the scene;
access a circle-of-confusion map for the scene depicted in the in-focus input image, wherein the circle-of-confusion map is generated based on the depth map and encodes a desired focal surface in the scene;
generate, using the machine-learning model, an output image with synthesized defocus-blur effect by processing the in-focus input image, the corresponding depth map, and the corresponding circle-of-confusion map; and
update the machine-learning model based on a comparison between the generated output image and a target image associated with the training sample, wherein the target image depicts the scene with a desired defocus-blur effect;
wherein the updated machine-learning model is configured to generate the images with defocus-blur effect based on the input images and the corresponding depth maps.

14. The media of claim 13,
wherein the depth map comprises a plurality of depth pixels;
wherein the circle-of-confusion map comprises a plurality of circle-of-confusion pixels that correspond to the plurality of depth pixels, respectively; and
wherein each of the circle-of-confusion pixels is computed based on (1) the corresponding depth pixel and (2) an aperture and a focal length of a virtual camera model.

15. The media of claim 13, wherein the training sample comprises one or more additional in-focus input images of the scene used for updating the machine-learning model, wherein color information of each of the in-focus input image and the one or more additional in-focus input images is associated with a single color channel, wherein the single color channels associated with the in-focus input image and the one or more additional in-focus input images are different.

16. The media of claim 15, wherein the software is further operable when executed to:
access one or more additional circle-of-confusion maps associated with the one or more additional in-focus input images, respectively; and
generate one or more additional output images by processing at least the one or more additional in-focus input images and the one or more additional circle-of-confusion maps using the machine-learning model;
wherein the updating of the machine-learning model is further based on the generated one or more additional output images.

17. A system for training a machine-learning model to generate images with defocus-blur effect based on input images and corresponding depth maps, the system comprising: one or more processors; and one or more computer-readable non-transitory storage media coupled to one or more of the processors and comprising instructions operable when executed by one or more of the processors to cause the system to:
access a training sample from a training dataset for the machine-learning model, the training sample for the machine-learning model comprising an in-focus input image of a scene and a corresponding depth map of the scene;
access a circle-of-confusion map for the scene depicted in the in-focus input image, wherein the circle-of-confusion map is generated based on the depth map and encodes a desired focal surface in the scene;
generate, using the machine-learning model, an output image with synthesized defocus-blur effect by processing the in-focus input image, the corresponding depth map, and the corresponding circle-of-confusion map using a machine learning model; and
update the machine-learning model based on a comparison between the generated output image and a target image associated with the training sample, wherein the target image depicts the scene with a desired defocus-blur effect;
wherein the updated machine-learning model is configured to generate the images with defocus-blur effect based on the input images and the corresponding depth maps.

18. The system of claim 17,
wherein the depth map comprises a plurality of depth pixels;
wherein the circle-of-confusion map comprises a plurality of circle-of-confusion pixels that correspond to the plurality of depth pixels, respectively; and
wherein each of the circle-of-confusion pixels is computed based on (1) the corresponding depth pixel and (2) an aperture and a focal length of a virtual camera model.

19. The system of claim 17, wherein the training sample comprises one or more additional in-focus input images of the scene used for updating the machine-learning model, wherein color information of each of the in-focus input image and the one or more additional in-focus input images is associated with a single color channel, wherein the single color channels associated with the in-focus input image and the one or more additional in-focus input images are different.

20. The system of claim 19, wherein the processors are further operable when executing the instructions to:
access one or more additional circle-of-confusion maps associated with the one or more additional in-focus input images, respectively; and
generate one or more additional output images by processing at least the one or more additional in-focus input images and the one or more additional circle-of-confusion maps using the machine-learning model;
wherein the updating of the machine-learning model is further based on the generated one or more additional output images.

* * * * *